(12) United States Patent
Lin et al.

(10) Patent No.: US 10,139,594 B2
(45) Date of Patent: Nov. 27, 2018

(54) OPTICAL IMAGING LENS SYSTEM, IMAGE CAPTURING UNIT AND ELECTRONIC DEVICE

(71) Applicant: LARGAN Precision Co., Ltd., Taichung (TW)

(72) Inventors: Cheng-Chen Lin, Taichung (TW); Shu-Yun Yang, Taichung (TW)

(73) Assignee: LARGAN Precision Co., Ltd., Taichung (TW)

( * ) Notice: Subject to any disclaimer, the term of this patent is extended or adjusted under 35 U.S.C. 154(b) by 117 days.

(21) Appl. No.: 15/427,659

(22) Filed: Feb. 8, 2017

(65) Prior Publication Data
US 2018/0095244 A1    Apr. 5, 2018

(30) Foreign Application Priority Data
Sep. 30, 2016   (TW) .............................. 105131579 A

(51) Int. Cl.
*G02B 13/00* (2006.01)
*G02B 9/34* (2006.01)
*G02B 3/04* (2006.01)

(52) U.S. Cl.
CPC ............. *G02B 13/004* (2013.01); *G02B 3/04* (2013.01); *G02B 9/34* (2013.01); *G02B 13/0065* (2013.01)

(58) Field of Classification Search
CPC ........ G02B 3/04; G02B 13/004; G02B 13/18; G02B 9/34–9/58
USPC ........................................................ 359/715
See application file for complete search history.

(56) References Cited

U.S. PATENT DOCUMENTS

| | | | |
|---|---|---|---|
| 5,513,042 A | 4/1996 | Itoh et al. | |
| 7,535,659 B2* | 5/2009 | Sano | G02B 9/34 359/715 |
| 7,633,690 B2* | 12/2009 | Yasuhiko | G02B 13/004 359/715 |
| 7,643,225 B1* | 1/2010 | Tsai | G02B 9/34 359/715 |
| 8,199,418 B2* | 6/2012 | Chen | G02B 9/34 359/715 |

(Continued)

FOREIGN PATENT DOCUMENTS

| CN | 101344632 | 5/2011 |
|---|---|---|
| JP | H03172813 | 7/1991 |

(Continued)

OTHER PUBLICATIONS

Taiwan Patent Office, "Office Action," issued in connection with Taiwan Patent Application No. 105131579, dated May 19, 2017, 10 pages.

*Primary Examiner* — Nicholas R Pasko
(74) *Attorney, Agent, or Firm* — Hanley, Flight & Zimmerman, LLC

(57) ABSTRACT

An optical imaging lens system includes, in order from an object side to an image side, a first lens element, a second lens element, a third lens element and a fourth lens element. The first lens element has positive refractive power. The second lens element has negative refractive power. The fourth lens element has an object-side surface being concave in a paraxial region thereof, wherein at least one of the object-side surface and an image-side surface of the fourth lens element has at least one inflection point. The optical imaging lens system has a total of four lens elements.

32 Claims, 28 Drawing Sheets

(56) References Cited

U.S. PATENT DOCUMENTS

| | | | |
|---|---|---|---|
| 8,503,108 B2 * | 8/2013 | Huang | G02B 9/34 359/715 |
| 8,817,391 B2 | 8/2014 | Chen | |
| 8,891,178 B2 | 11/2014 | Hsu et al. | |
| 8,982,483 B2 | 3/2015 | Chou et al. | |
| 9,030,760 B2 | 5/2015 | Liao et al. | |
| 9,383,556 B2 | 7/2016 | Hsueh et al. | |
| 2011/0058264 A1 | 3/2011 | Zhan et al. | |
| 2013/0208365 A1 * | 8/2013 | Hsu | G02B 13/004 359/715 |
| 2013/0278714 A1 | 10/2013 | Hirose | |
| 2014/0022651 A1 | 1/2014 | Chen et al. | |
| 2014/0184872 A1 | 7/2014 | Ho et al. | |
| 2015/0077867 A1 | 3/2015 | Chen et al. | |
| 2016/0116707 A1 | 4/2016 | Chen et al. | |

FOREIGN PATENT DOCUMENTS

| | | |
|---|---|---|
| JP | 2002214528 | 7/2002 |
| JP | 2007212878 | 8/2007 |
| JP | 2009003443 | 1/2009 |
| JP | 2009020182 | 1/2009 |
| JP | 2013092584 | 5/2013 |
| JP | 2013125073 | 6/2013 |
| JP | 2014174415 | 9/2014 |
| TW | 201616171 A | 5/2016 |

* cited by examiner

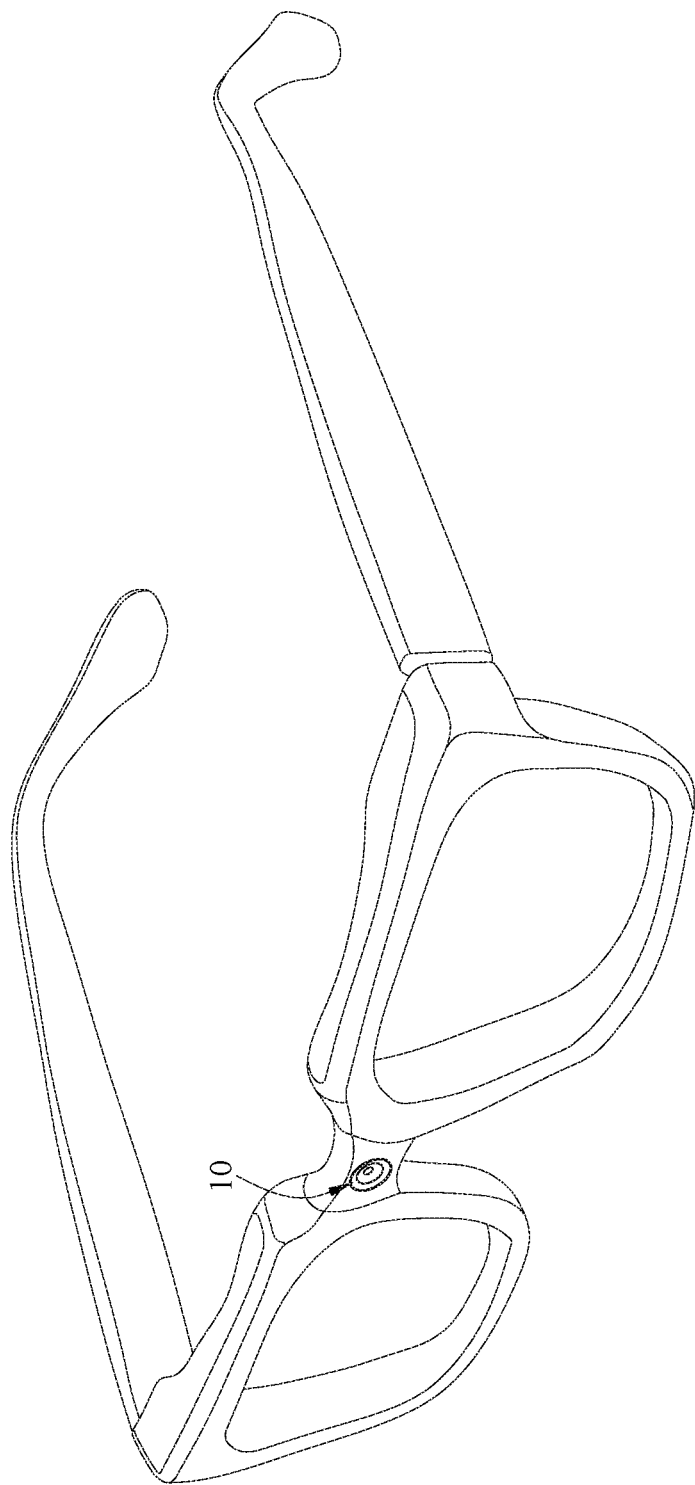

OPTICAL IMAGING LENS SYSTEM, IMAGE CAPTURING UNIT AND ELECTRONIC DEVICE

RELATED APPLICATIONS

This application claims priority to Taiwan Application 105131579, filed Sep. 30, 2016, which is incorporated by reference herein in its entirety.

BACKGROUND

Technical Field

The present disclosure relates to an optical imaging lens system, an image capturing unit and an electronic device, more particularly to an optical imaging lens system and an image capturing unit applicable to an electronic device.

Description of Related Art

In recent years, with the popularity of electronic devices having camera functionalities, the demand of miniaturized optical systems has been increasing. As the advanced semiconductor manufacturing technologies have reduced the pixel size of sensors, and compact optical systems have gradually evolved toward the field of higher megapixels, there is an increasing demand for compact optical systems featuring better image quality.

The optical systems have been widely applied to different kinds of electronic devices for various requirements. For the conventional optical systems having small angle of view, there is less flexibility in the design of the shape and the material of the lens element, such that it is unfavorable for keeping the optical systems compact. Moreover, it is difficult to design the conventional optical systems for simultaneously satisfying the requirements of less lens molding problems, easier lens assembling process and low sensitivity. Thereby, in order to fulfill market demands, there is a need to develop an optical system simultaneously featuring telephoto effect, compact size, easy assembling process and high image quality to be widely applied to more kinds of electronic devices.

SUMMARY

According to one aspect of the present disclosure, an optical imaging lens system includes, in order from an object side to an image side, a first lens element, a second lens element, a third lens element and a fourth lens element. The first lens element has positive refractive power. The second lens element has negative refractive power. The fourth lens element has an object-side surface being concave in a paraxial region thereof, wherein at least one of the object-side surface and an image-side surface of the fourth lens element has at least one inflection point. The optical imaging lens system has a total of four lens elements. When a central thickness of the first lens element is CT1, a central thickness of the second lens element is CT2, a central thickness of the fourth lens element is CT4, a focal length of the optical imaging lens system is f, a ratio of the focal length of the optical imaging lens system to a focal length of the first lens element is P1, a ratio of the focal length of the optical imaging lens system to a focal length of the second lens element is P2, a ratio of the focal length of the optical imaging lens system to a focal length of the third lens element is P3, a ratio of the focal length of the optical imaging lens system to a focal length of the fourth lens element is P4, and a curvature radius of the image-side surface of the fourth lens element is R8, the following conditions are satisfied:

$0 < CT1/CT2 < 1.20$;

$0 < CT4/CT2 < 0.45$;

$(|P3|+|P4|)/(|P1|+|P2|) < 0.63$; and $|R8/f| < 7.0$.

According to another aspect of the present disclosure, an optical imaging lens system includes, in order from an object side to an image side, a first lens element, a second lens element, a third lens element and a fourth lens element. The first lens element has positive refractive power. The second lens element has negative refractive power. The fourth lens element has an object-side surface being concave in a paraxial region thereof, wherein at least one of the object-side surface and an image-side surface of the fourth lens element has at least one inflection point. The optical imaging lens system has a total of four lens elements. When a central thickness of the first lens element is CT1, a central thickness of the second lens element is CT2, a focal length of the first lens element is f1, a focal length of the second lens element is f2, and a focal length of the fourth lens element is f4, the following conditions are satisfied:

$0 < CT1/CT2 < 1.20$;

$0 < f1/CT2 < 3.60$; and $|f2/f4| < 1.05$.

According to one aspect of the present disclosure, an image capturing unit includes the aforementioned optical imaging lens system and an image sensor, wherein the image sensor is disposed on an image surface of the optical imaging lens system.

According to one aspect of the present disclosure, an electronic device includes the aforementioned image capturing unit.

According to still another aspect of the present disclosure, an optical imaging lens system includes, in order from an object side to an image side, a first lens element, a second lens element, a third lens element and a fourth lens element. The first lens element has positive refractive power. The second lens element has negative refractive power. The fourth lens element has an image-side surface being convex in a paraxial region thereof, wherein at least one of an object-side surface and the image-side surface of the fourth lens element has at least one inflection point. The optical imaging lens system has a total of four lens elements. When a central thickness of the first lens element is CT1, a central thickness of the second lens element is CT2, a focal length of the optical imaging lens system is f, a focal length of the first lens element is f1, and a curvature radius of the image-side surface of the fourth lens element is R8, the following conditions are satisfied:

$0 < CT1/CT2 < 1.20$;

$0 < f1/CT2 < 3.60$; and $|R8/f| < 7.0$.

BRIEF DESCRIPTION OF THE DRAWINGS

The disclosure can be better understood by reading the following detailed description of the embodiments, with reference made to the accompanying drawings as follows:

FIG. 28 shows an electronic device according to still another embodiment.

DETAILED DESCRIPTION

Figure 1:
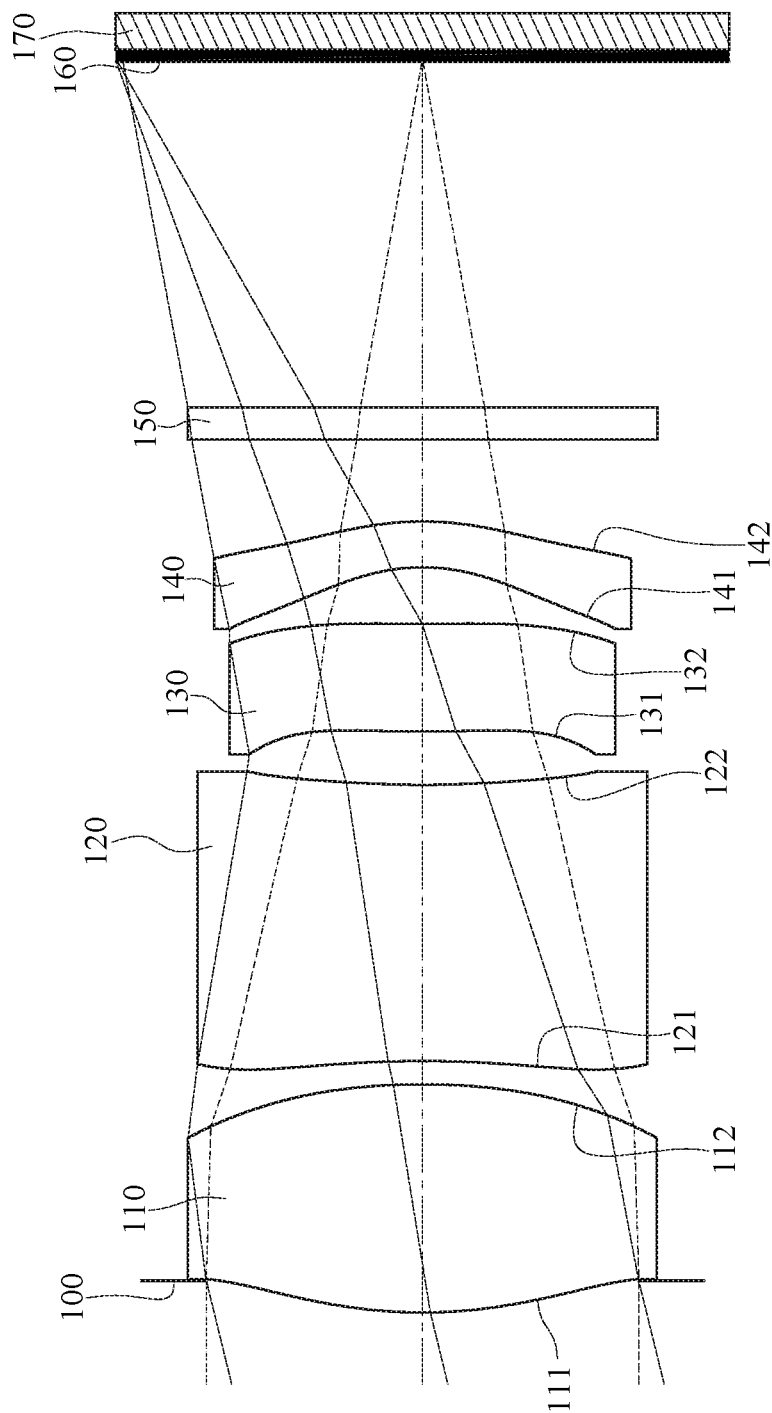
FIG. 1 is a schematic view of an image capturing unit according to the 1st embodiment of the present disclosure.

An optical imaging lens system includes, in order from an object side to an image side, a first lens element, a second lens element, a third lens element and a fourth lens element. The optical imaging lens system has a total of four lens elements.

There can be an air gap in a paraxial region between each adjacent lens element of the optical imaging lens system; that is, each of the first through the fourth lens elements can be a single and non-cemented lens element. Due to the manufacturing process of the cemented lenses is more complex than the non-cemented lenses, particularly when an image-side surface of one lens element and an object-side surface of the following lens element need to have accurate curvature to ensure their highly cemented characteristic. However, during the cementing process, those two lens elements might not be highly cemented due to displacement and it is thereby not favorable for the image quality. Therefore, there can be an air gap in a paraxial region between each adjacent lens element of the optical imaging lens system in the present disclosure for solving the problem generated by the cemented lens elements.

The first lens element has positive refractive power. Therefore, it is favorable for providing sufficient light convergence capability so as to reduce a total track length of the optical imaging lens system, thereby maintaining a compact size thereof.

The second lens element has negative refractive power. Therefore, it is favorable for properly balancing the positive refractive power distribution between the first and the second lens elements while correcting chromatic aberration.

The third lens element can have an object-side surface being convex in a paraxial region thereof and an image-side surface being concave in a paraxial region thereof. Therefore, the shape of the third lens element can be properly arranged so as to be favorable for correcting aberrations, reducing a back focal length of the optical imaging lens system, and correcting astigmatism to improve image quality.

The fourth lens element can have an object-side surface being concave in a paraxial region thereof; therefore, it is favorable for correcting the Petzval sum so as to improve the flatness of an image surface. Moreover, the fourth lens element can have an image-side surface being convex in a paraxial region thereof; therefore, it is favorable for correcting astigmatism and providing sufficient back focal length for accommodating additional opto-components so that the configuration of the optical imaging lens system can be more flexible to design. Furthermore, at least one of the object-side surface and the image-side surface of the fourth lens element can have at least one inflection point; therefore, it is favorable for controlling the incident angle of light projecting onto the image sensor so as to keep sufficient illumination; also, it is favorable for correcting aberrations at the off-axial region so as to improve image quality.

When a central thickness of the first lens element is CT1, a central thickness of the second lens element is CT2, the following condition is satisfied: $0<CT1/CT2<1.20$. Therefore, it is favorable for properly arranging the thicknesses of the first and the second lens elements so as to obtain a balance between the image quality and the sensitivity. Preferably, the following condition can also be satisfied: $0<CT1/CT2<1.0$.

When the central thickness of the second lens element is CT2, a central thickness of the fourth lens element is CT4, the following condition can be satisfied: $0<CT4/CT2<0.45$. Therefore, it is favorable for arranging a ratio of the thickness of the fourth lens element to the thickness of the second lens element so as to prevent improper space allocation in the optical imaging lens system, thereby improving image quality.

When a ratio of a focal length of the optical imaging lens system to a focal length of the first lens element is P1, a ratio of the focal length of the optical imaging lens system to a focal length of the second lens element is P2, a ratio of the focal length of the optical imaging lens system to a focal length of the third lens element is P3, a ratio of the focal length of the optical imaging lens system to a focal length of the fourth lens element is P4, the following condition can be satisfied: $(|P3|+|P4|)/(|P1|+|P2|)<0.63$. Therefore, most of the refractive power of the optical imaging lens system can be contributed by the first and the second lens elements for preventing overloading the refractive power on the third and the fourth lens elements, thereby keeping the optical imaging lens system compact to be applicable to more kinds of electronic devices. Preferably, the following condition can also be satisfied: $(|P3|+|P4|)/(|P1|+|P2|)<0.55$.

When the focal length of the optical imaging lens system is f, a curvature radius of the image-side surface of the fourth lens element is R8, the following condition can be satisfied: $|R8/f|<7.0$. Therefore, it is favorable for arranging the back focal length so as to prevent overly long track length. Preferably, the following condition can also be satisfied: $0.25<|R8/f|<5.0$.

When the central thickness of the second lens element is CT2, the focal length of the first lens element is f1, the following condition can be satisfied: $0<f1/CT2<3.60$. Therefore, it is favorable for arranging a ratio of the focal length of the first lens element to the thickness of the second lens element so as to balance the refractive power distribution at the object side of the optical imaging lens system and reduce sensitivity. Preferably, the following condition can also be satisfied: $0<f1/CT2<3.20$.

When the focal length of the second lens element is f2, the focal length of the fourth lens element is f4, the following condition can be satisfied: $|f2/f4|<1.05$. Therefore, it is favorable for a proper refractive power distribution between the second and the fourth lens elements so as to reduce the change in direction of incident light ray, thereby eliminating stray light. Preferably, the following condition can also be satisfied: $|f2/f4|<0.90$.

Figure 21:
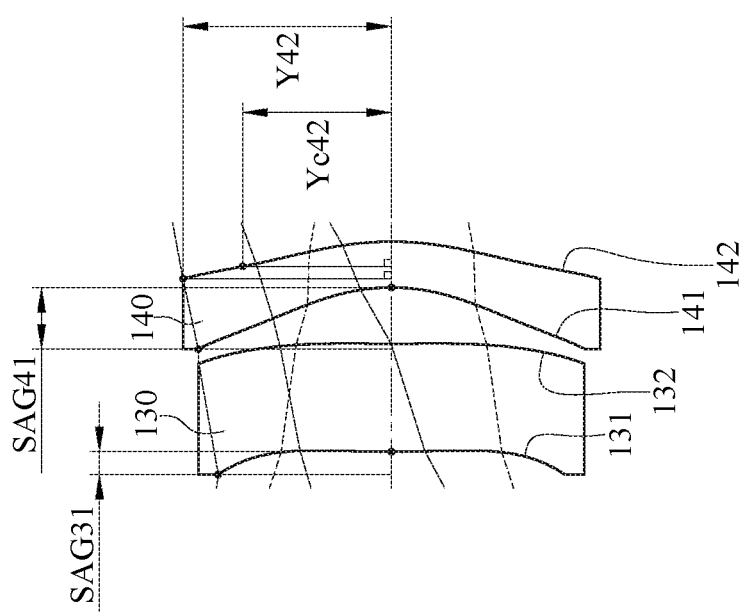
FIG. 21 shows a schematic view of the parameters SAG41, SAG31, Y42 and Yc42 according to the 1st embodiment of the present disclosure.

When a vertical distance between a maximum effective radius position of the image-side surface of the fourth lens element and an optical axis is Y42, an entrance pupil diameter of the optical imaging lens system is EPD, the following condition can be satisfied: $|(2*Y42)/EPD|\leq 1.35$. Therefore, a ratio of the maximum effective radius of the image-side surface of the fourth lens element to the entrance pupil diameter can be properly arranged so as to keep the optical imaging lens system compact and increase assembling yield rate. Preferably, the following condition can also be satisfied: $|(2*Y42)/EPD|<1.0$. As seen in FIG. 21, it shows a schematic view of the parameter Y42 according to the 1st embodiment of the present disclosure.

When a sum of axial distances between each adjacent lens element of the optical imaging lens system is ΣAT, an axial distance between the image-side surface of the fourth lens element and the image surface is BL, the following condition can be satisfied: $\Sigma AT/BL<1.10$. Therefore, it is favorable for arranging a ratio of each axial distance to the back focal length so as to obtain a balance between compact size and image quality.

When the focal length of the optical imaging lens system is f, a vertical distance between one inflection point on the image-side surface of the fourth lens element and the optical axis is Yc42, the following condition can be satisfied: $3.0<f/Yc42<25.0$. Therefore, it is favorable for arranging the shape on the image-side surface of the fourth lens element so as to correct aberrations at the off-axial region. As seen in FIG. 21, it shows a schematic view of the parameter Yc42 according to the 1st embodiment of the present disclosure.

When a curvature radius of the object-side surface of the fourth lens element is R7, the curvature radius of the image-side surface of the fourth lens element is R8, the following condition can be satisfied: $(R7+R8)/(R7-R8)<-1.30$. Therefore, it is favorable for arranging the curvature of the surfaces of the fourth lens element so as to obtain proper effective radii thereof for easier lens assembling and better aberration corrections.

When half of a maximum field of view of the optical imaging lens system is HFOV, the following condition can be satisfied: $3.45<1/\sin(HFOV)$. Therefore, it is favorable for arranging a proper field of view for the characteristic of small angle of view.

When an Abbe number of the second lens element is V2, an Abbe number of the third lens element is V3, the following conditions can be satisfied: $V2\leq 30$; and $V3\leq 30$. Therefore, it is favorable for flexibly selecting the materials of the second and the third lens elements so as to maintain a compact size of the optical imaging lens system having small angle of view.

According to the present disclosure, the optical imaging lens system further includes an aperture stop which can be disposed between an imaged object and the first lens element. Therefore, it is favorable for positioning the aperture stop to produce telecentric effect, thereby improving the image-sensing efficiency of an image sensor.

When a maximum image height of the optical imaging lens system (half of a diagonal length of an effective photosensitive area of an image sensor) is ImgH, the entrance pupil diameter of the optical imaging lens system is EPD, the following condition can be satisfied: $0<ImgH/EPD\leq 1$. Therefore, it is favorable for providing sufficient image brightness while keeping high image resolution so as to produce a telephoto effect.

Figure 22:
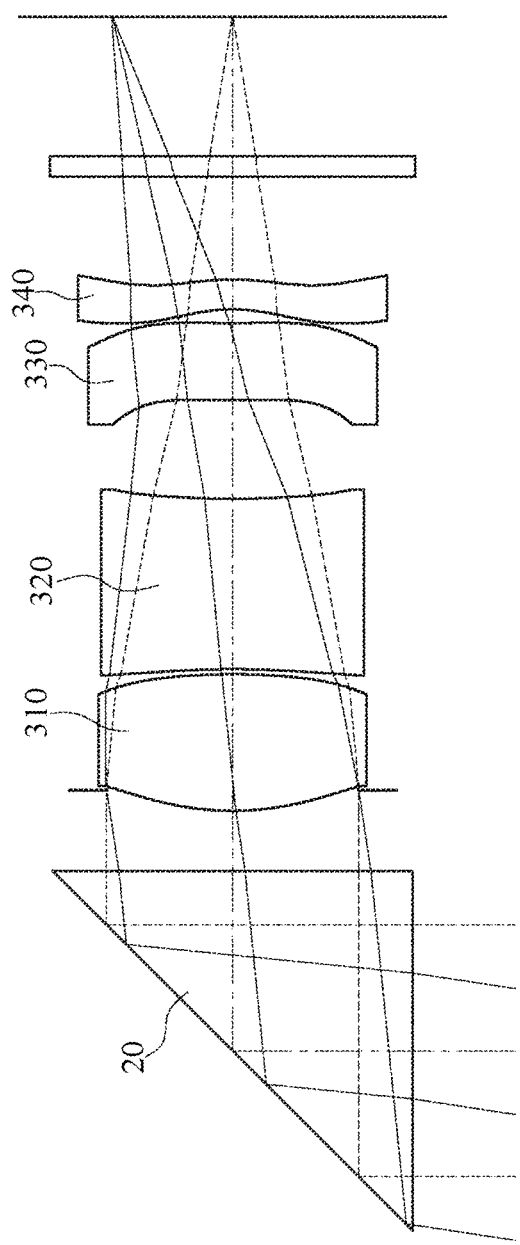
FIG. 22 shows a schematic view of a configuration of a prism and the image capturing unit according to the 3rd embodiment of the present disclosure.
Figure 23:
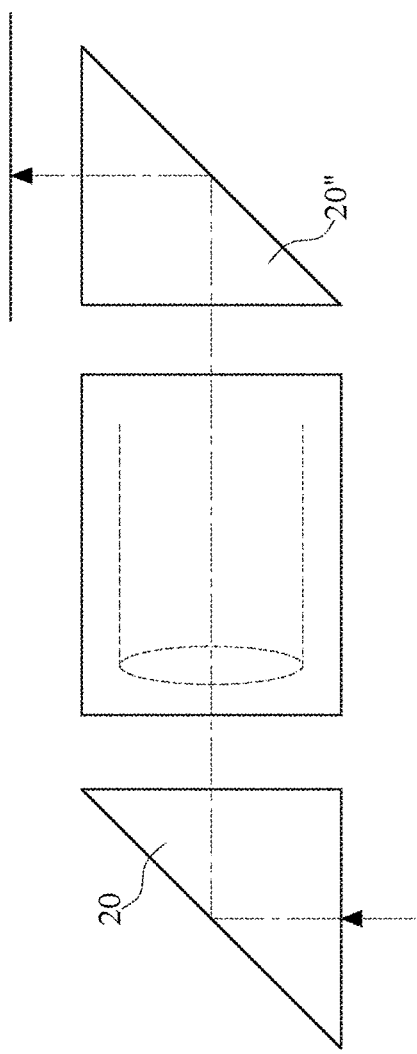
FIG. 23 shows a schematic view of a configuration of two prisms and an image capturing unit according to one embodiment of the present disclosure.
Figure 24:
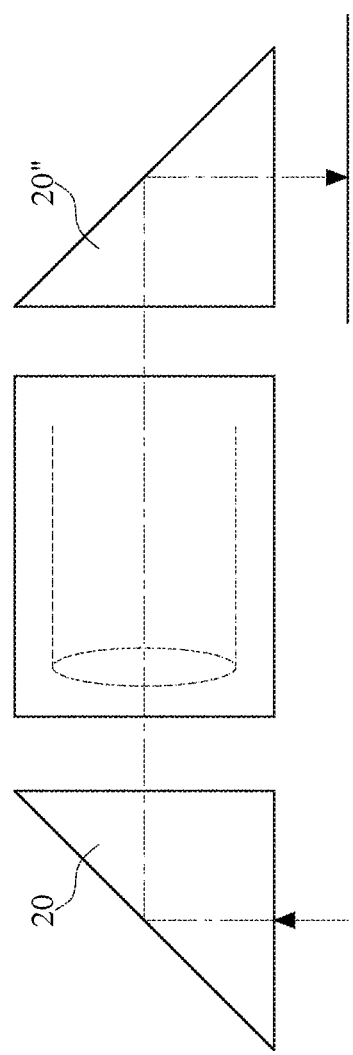
FIG. 24 shows a schematic view of another configuration of two prisms and an image capturing unit according to one embodiment of the present disclosure.
Figure 25:
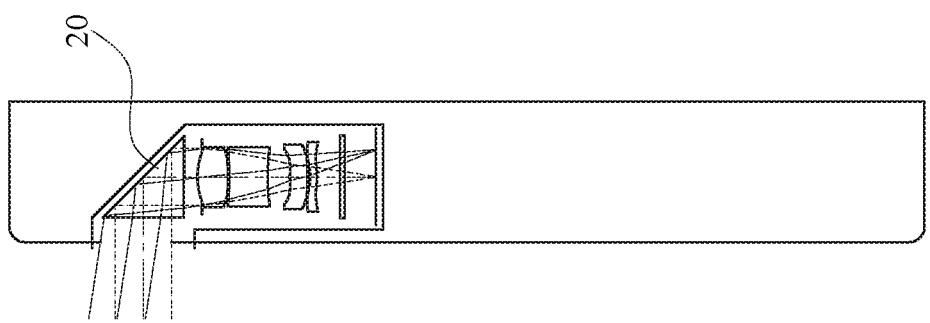
FIG. 25 shows a schematic view of a configuration of a prism and an image capturing unit in an electronic device according to one embodiment of the present disclosure.

According to the present disclosure, the optical imaging lens system can include at least one prism. Therefore, the light rays can be deviated, so that it is favorable for improving the space utilization in the electronic device while flexibly designing the lens configuration. As seen in FIG. 22, it shows a schematic view of a configuration of a prism and the image capturing unit according to the 3rd embodiment of the present disclosure; wherein, a prism 20 is disposed between an imaged object (not shown in the drawing) and an image capturing unit (its reference numeral is omitted), but the present disclosure is not limited to the exemplary configuration in FIG. 22. As seen in FIGS. 23 and 24, in some exemplary configurations, there can be an additional prism 20" disposed between the lens elements of the optical imaging lens system and the image surface. As seen in FIGS. 23 through 25, by disposing the prism 20 in the image capturing unit, the incident light rays are changed in direction so that the thickness of the electronic device is not subjected to the total track length of the optical imaging lens system. When a displacement in parallel with the optical axis from an axial vertex of an object-side surface of the third lens element to a maximum effective radius position of the object-side surface of the third lens element is SAG31, a displacement in parallel with the optical axis from an axial vertex of the object-side surface of the fourth lens element to a maximum effective radius position of the object-side surface of the fourth lens element is SAG41, the following condition can be satisfied: −0.10<SAG41/SAG31<6.50. Therefore, the object-side surface shapes of the third lens and the fourth lens elements are properly arranged so as to be favorable for correcting aberrations to improve image quality. As seen in FIG. 21, it shows a schematic view of the parameters SAG31 and SAG41 according to the 1st embodiment of the present disclosure. When the direction from the axial vertex of a surface to the maximum effective radius position of the same surface is facing towards the image side of the optical imaging lens system, the value of SAG31 or SAG41 is positive; when the direction from the axial vertex of the surface to the maximum effective radius position of the same surface is facing towards the object side of the optical imaging lens system, the value of SAG31 or SAG41 is negative.

When the Abbe number of the second lens element is V2, the Abbe number of the third lens element is V3, the following condition can be satisfied: V2+V3<50.0. Therefore, it is favorable for converging light rays having different wavelengths so as to prevent blur in the image.

When an axial distance between an object-side surface of the first lens element and the image-side surface of the fourth lens element is TD, the central thickness of the second lens element is CT2, the following condition can be satisfied: 0<TD/CT2<3.55. Therefore, it is favorable for arranging a proper amount of space occupied by the second lens element so as to strengthen the negative refractive power of the second lens element, thereby enhancing the telephoto effect.

When the central thickness of the second lens element is CT2, a central thickness of the third lens element is CT3, the central thickness of the fourth lens element is CT4, the following condition can be satisfied: 0<(CT3+CT4)/CT2<1.0. Therefore, it is favorable for balancing the thicknesses of the second, the third and the fourth lens elements so as to obtain a better refractive power distribution.

When the maximum image height of the optical imaging lens system is ImgH, the focal length of the optical imaging lens system is f, the following condition can be satisfied: 0 (rad)<2*arctan(ImgH/2f)<0.35 (rad), wherein rad is a symbol representing the radian. Therefore, it is favorable for arranging the angle of view so as to provide sufficient angle of coverage while providing significant telephoto effect, thereby preventing vignetting toward the edge of the image.

When a maximum value among all maximum effective radii of all surfaces of the lens elements of the optical imaging lens system is SDmax, a minimum value among all maximum effective radii of all surfaces of the lens elements of the optical imaging lens system is SDmin, the following condition can be satisfied: SDmax/SDmin<2.0. Therefore, the effective radii of the lens surfaces can be properly arranged so as to be favorable for obtaining a lens configuration having small angle of view, thereby meeting the requirement of telephoto effect.

According to the present disclosure, an axial distance between the second lens element and the third lens element can be the maximum among all axial distances between each of the adjacent lens elements of the optical imaging lens system. Therefore, it is favorable for disposing additional opto-components between the second lens element and the third lens element so as to improve image quality.

When an axial distance between the first lens element and the second lens element is T12, the axial distance between the second lens element and the third lens element is T23, an axial distance between the third lens element and the fourth lens element is T34, the following condition can be satisfied: T12<T34<T23. Therefore, the axial distances between each adjacent lens element can be properly arranged so as to be favorable for easy lens assembly.

According to the present disclosure, the lens elements of the optical imaging lens system can be made of glass or plastic material. When the lens elements are made of glass material, the refractive power distribution of the optical imaging lens system may be more flexible to design. When the lens elements are made of plastic material, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof and to further decrease the required number of the lens elements. Therefore, the total track length of the optical imaging lens system can also be reduced.

According to the present disclosure, each of an object-side surface and an image-side surface of a lens element has a paraxial region and an off-axial region.

The paraxial region refers to the region of the surface where light rays travel close to the optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image surface of the optical imaging lens system on a corresponding image sensor can be flat or curved, particularly a concave curved surface facing towards the object side of the optical imaging lens system.

According to the present disclosure, the optical imaging lens system can include at least one stop, such as an aperture stop, a glare stop or a field stop. Said glare stop or said field stop is allocated for eliminating the stray light and thereby improving the image quality thereof.

According to the present disclosure, an aperture stop can be configured as a front stop or a middle stop. A front stop disposed between the imaged object and the first lens element can produce a telecentric effect by providing a longer distance between an exit pupil and the image surface, thereby improving the image-sensing efficiency of an image sensor (for example, CCD or CMOS). A middle stop disposed between the first lens element and the image surface is favorable for enlarging the view angle and thereby provides a wider field of view.

According to the present disclosure, an image capturing unit includes the aforementioned optical imaging lens system and image sensor, wherein the image sensor is disposed on the image side and can be located on or near the image surface of the aforementioned optical imaging lens system. In some embodiments, the image capturing unit can further include a barrel member, a holder member or a combination thereof.

Figure 26:
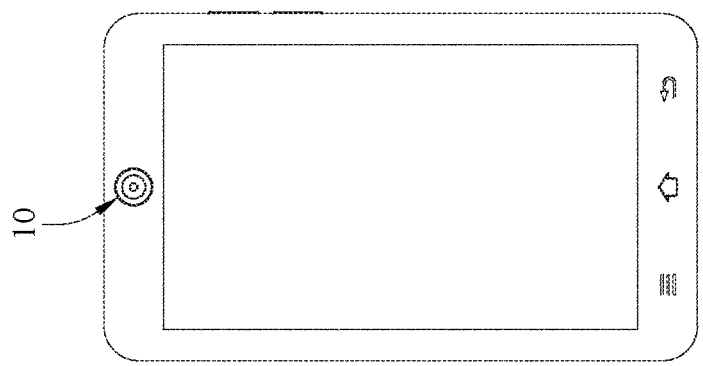
FIG. 26 shows an electronic device according to one embodiment.
Figure 27:
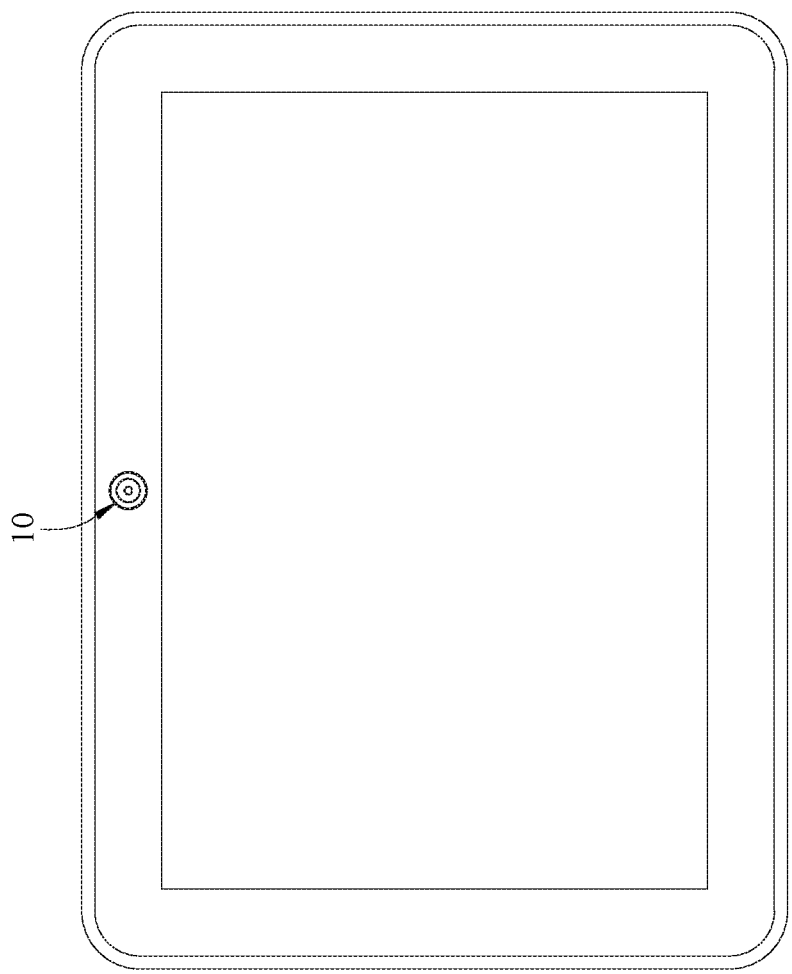
FIG. 27 shows an electronic device according to another embodiment.

In FIG. 26, FIG. 27 and FIG. 28, an image capturing unit 10 may be installed in, but not limited to, an electronic device, including a smart phone (FIG. 26), a tablet computer (FIG. 27) or a wearable device (FIG. 28). The electronic devices shown in the figures are only exemplary for showing the image capturing unit of the present disclosure installed in an electronic device and are not limited thereto. In some embodiments, the electronic device can further include, but not limited to, a display unit, a control unit, a storage unit, a random access memory unit (RAM), a read only memory unit (ROM) or a combination thereof.

According to the present disclosure, the optical imaging lens system can be optionally applied to optical systems with a movable focus. Furthermore, the optical imaging lens system is featured with good capability in aberration corrections and high image quality, and can be applied to 3D (three-dimensional) image capturing applications, in products such as digital cameras, mobile devices, digital tablets, wearable devices, smart televisions, multiple lens devices, network surveillance devices, motion sensing input devices, dashboard cameras, vehicle backup cameras and other electronic imaging devices. According to the above description of the present disclosure, the following specific embodiments are provided for further explanation.

1st Embodiment

Figure 2:
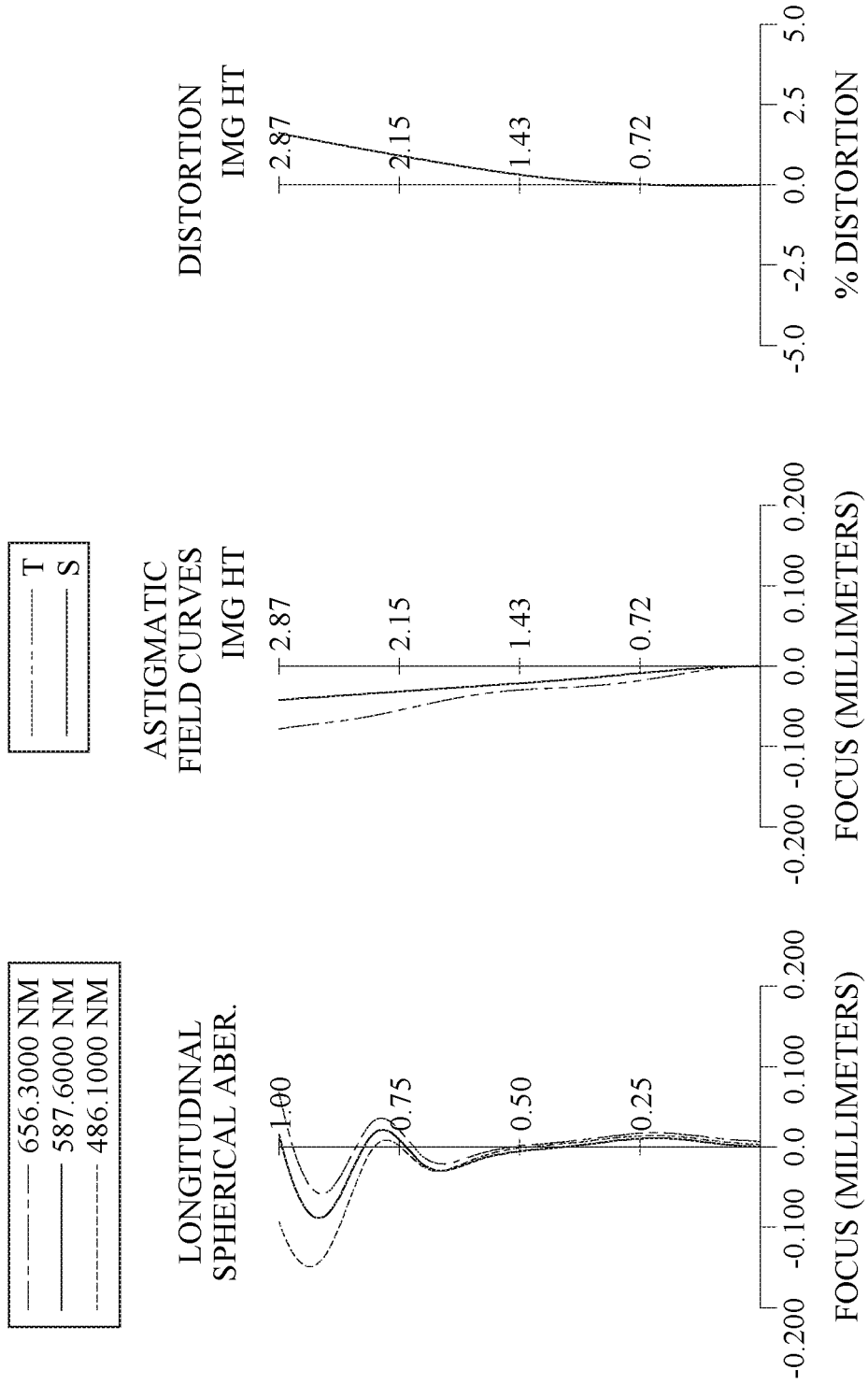
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging lens system (its reference numeral is omitted) of the present disclosure and an image sensor 170. The optical imaging lens system includes, in order from an object side to an image side, an aperture stop 100, a first lens element 110, a second lens element 120, a third lens element 130, a fourth lens element 140, a filter 150 and an image surface 160, wherein the optical imaging lens system has a total of four single and non-cemented lens elements (110-140).

The first lens element 110 with positive refractive power has an object-side surface 111 being convex in a paraxial region thereof and an image-side surface 112 being convex in a paraxial region thereof. The first lens element 110 is made of plastic material and has the object-side surface 111 and the image-side surface 112 being both aspheric.

The second lens element 120 with negative refractive power has an object-side surface 121 being concave in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric.

The fourth lens element 140 with negative refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric. Both the object-side surface 141 and the image-side surface 142 of the fourth lens element 140 have at least one inflection point.

The filter 150 is made of glass material and located between the fourth lens element 140 and the image surface 160, and will not affect the focal length of the optical imaging lens system. The image sensor 170 is disposed on or near the image surface 160 of the optical imaging lens system.

The equation of the aspheric surface profiles of the aforementioned lens elements of the 1st embodiment is expressed as follows:

$$X(Y) = (Y^2/R)/(1 + \mathrm{sqrt}(1 - (1+k)\times(Y/R)^2)) + \sum_i (Ai)\times(Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the optical imaging lens system of the image capturing unit according to the 1st embodiment, when a focal length of the optical imaging lens system is f, an f-number of the optical imaging lens system is Fno, and half of a maximum field of view of the optical imaging lens system is HFOV, these parameters have the following values: f=11.55 millimeters (mm), Fno=2.85; and HFOV=13.8 degrees (deg.).

When half of the maximum field of view of the optical imaging lens system is HFOV, the following condition is satisfied: 1/sin(HFOV)=4.19.

When an Abbe number of the second lens element 120 is V2, the following condition is satisfied: V2=23.5.

When an Abbe number of the third lens element 130 is V3, the following condition is satisfied: V3=23.3.

When the Abbe number of the second lens element 120 is V2, the Abbe number of the third lens element 130 is V3, the following condition is satisfied: V2+V3=46.8.

When a central thickness of the first lens element 110 is CT1, a central thickness of the second lens element 120 is CT2, the following condition is satisfied: CT1/CT2=0.83.

When the central thickness of the second lens element 120 is CT2, a central thickness of the fourth lens element 140 is CT4, the following condition is satisfied: CT4/CT2=0.17.

When the central thickness of the second lens element 120 is CT2, a central thickness of the third lens element 130 is CT3, the central thickness of the fourth lens element 140 is CT4, the following condition is satisfied: (CT3+CT4)/CT2=0.56.

When an axial distance between the object-side surface 111 of the first lens element 110 and the image-side surface 142 of the fourth lens element 140 is TD, the central thickness of the second lens element 120 is CT2, the following condition is satisfied: TD/CT2=2.86.

When a curvature radius of the object-side surface 141 of the fourth lens element 140 is R7, a curvature radius of the image-side surface 142 of the fourth lens element 140 is R8, the following condition is satisfied: (R7+R8)/(R7−R8)=−4.55.

When the focal length of the optical imaging lens system is f, the curvature radius of the image-side surface 142 of the fourth lens element 140 is R8, the following condition is satisfied: |R8/f|=0.25.

When a focal length of the first lens element 110 is f1, the central thickness of the second lens element 120 is CT2, the following condition is satisfied: f1/CT2=2.02.

When a focal length of the second lens element 120 is f2, a focal length of the fourth lens element 140 is f4, the following condition is satisfied: |f2/f4|=0.66.

When a ratio of the focal length of the optical imaging lens system to the focal length of the first lens element 110 is P1, a ratio of the focal length of the optical imaging lens system to the focal length of the second lens element 120 is P2, a ratio of the focal length of the optical imaging lens system to a focal length of the third lens element 130 is P3, a ratio of the focal length of the optical imaging lens system to the focal length of the fourth lens element 140 is P4, the following condition is satisfied: (|P3|+|P4|)/(|P1|+|P2|)=0.41.

When a vertical distance between a maximum effective radius position of the image-side surface 142 of the fourth lens element 140 and an optical axis is Y42, an entrance pupil diameter of the optical imaging lens system is EPD, the following condition is satisfied: |(2*Y42)/EPD|=0.96.

When a maximum image height of the optical imaging lens system is ImgH, the entrance pupil diameter of the optical imaging lens system is EPD, the following condition is satisfied: ImgH/EPD=0.71.

When a sum of axial distances between each adjacent lens element of the optical imaging lens system is ΣAT, an axial distance between the image-side surface 142 of the fourth lens element 140 and the image surface 160 is BL, the following condition is satisfied: ΣAT/BL=0.29.

When a displacement in parallel with the optical axis from an axial vertex of the object-side surface 131 of the third lens element 130 to a maximum effective radius position of the object-side surface 131 thereof is SAG31, a displacement in parallel with the optical axis from an axial vertex of the object-side surface 141 of the fourth lens element 140 to a maximum effective radius position of the object-side surface 141 thereof is SAG41, the following condition is satisfied: SAG41/SAG31=2.71.

When the focal length of the optical imaging lens system is f, a vertical distance between the at least one inflection point on the image-side surface 142 of the fourth lens element 140 and the optical axis is Yc42, the following condition is satisfied: f/Yc42=12.09.

When the maximum image height of the optical imaging lens system is ImgH, the focal length of the optical imaging lens system is f, the following condition is satisfied: 2*arctan(ImgH/2f)=0.25 (rad).

When a maximum value among all maximum effective radii of all the surfaces of the lens elements (110-140) of the optical imaging lens system is SDmax, a minimum value among all maximum effective radii of all the surfaces of the lens elements (110-140) of the optical imaging lens system is SDmin, the following condition is satisfied: SDmax/SDmin=1.35.

The detailed optical data of the 1st embodiment are shown in Table 1 and the aspheric surface data are shown in Table 2 below.

TABLE 1

1st Embodiment
f = 11.55 mm, Fno = 2.85, HFOV = 13.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.299 | | | | |
| 2 | Lens 1 | 4.607 | (ASP) | 2.139 | Plastic | 1.545 | 56.0 | 5.24 |
| 3 | | −6.264 | (ASP) | 0.218 | | | | |
| 4 | Lens 2 | −10.123 | (ASP) | 2.590 | Plastic | 1.639 | 23.5 | −7.36 |
| 5 | | 9.659 | (ASP) | 0.499 | | | | |
| 6 | Lens 3 | 10.346 | (ASP) | 1.013 | Plastic | 1.639 | 23.3 | 23.35 |
| 7 | | 32.494 | (ASP) | 0.527 | | | | |
| 8 | Lens 4 | −1.866 | (ASP) | 0.430 | Plastic | 1.544 | 55.9 | −11.12 |
| 9 | | −2.918 | (ASP) | 0.771 | | | | |
| 10 | Filter | Plano | | 0.300 | Glass | 1.517 | 64.2 | — |
| 11 | | Plano | | 3.242 | | | | |
| 12 | Image | Plano | | — | | | | |

Note:
Reference wavelength is 587.6 nm (d-line).

TABLE 2

Aspheric Coefficients

| | Surface # | | | |
|---|---|---|---|---|
| | 2 | 3 | 4 | 5 |
| k = | −2.8922E−01 | 3.7255E+00 | 1.5031E+01 | −6.5107E+01 |
| A4 = | −4.7858E−03 | −2.7359E−03 | 7.0808E−03 | −3.1548E−03 |
| A6 = | 6.2797E−04 | −1.6123E−03 | −9.6466E−04 | 1.1715E−03 |
| A8 = | −1.8834E−03 | 1.1079E−03 | 1.1546E−03 | 6.3816E−04 |
| A10 = | 1.2877E−03 | −2.8140E−04 | −1.5895E−04 | −1.0513E−04 |
| A12 = | −4.9953E−04 | 4.0205E−05 | −2.8192E−06 | 9.3966E−06 |

TABLE 2-continued

| Aspheric Coefficients | | | | |
|---|---|---|---|---|
| A14 = | 9.6468E−05 | −2.6956E−06 | 1.3662E−06 | — |
| A16 = | −7.2123E−06 | — | — | — |

| | Surface # | | | |
|---|---|---|---|---|
| | 6 | 7 | 8 | 9 |
| k = | −9.0000E+01 | 8.7701E+01 | −2.7975E−01 | 5.1928E−02 |
| A4 = | −4.1911E−02 | −4.8599E−02 | 7.5987E−04 | 1.0710E−02 |
| A6 = | 3.1214E−03 | 1.8951E−02 | 6.2405E−02 | 3.3931E−02 |
| A8 = | −4.8993E−03 | −6.0491E−03 | −3.2223E−02 | −2.0084E−02 |
| A10 = | 2.6066E−03 | 1.1626E−03 | 8.6768E−03 | 6.1153E−03 |
| A12 = | −7.5813E−04 | −1.1122E−04 | −1.1925E−03 | −1.1107E−03 |
| A14 = | 9.9395E−05 | 1.5963E−06 | 6.0621E−05 | 1.1212E−04 |
| A16 = | — | — | 4.0831E−07 | −4.7566E−06 |

In Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are related to the corresponding schematic and aberration curves figures in the drawing, and the definitions of the terms in the tables are the same as Table 1 and Table 2 of the 1st embodiment. Therefore, an explanation in this regard will not be provided again.

2nd Embodiment

Figure 3:
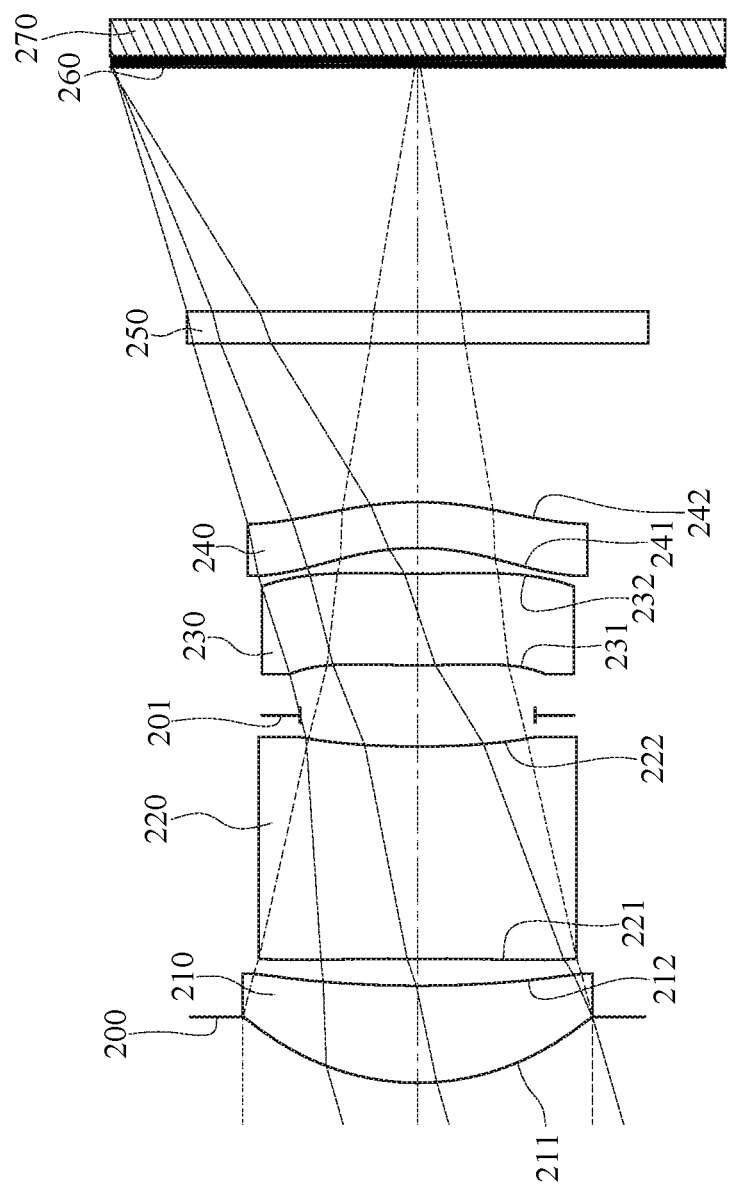
FIG. 3 is a schematic view of an image capturing unit according to the 2nd embodiment of the present disclosure.
Figure 4:
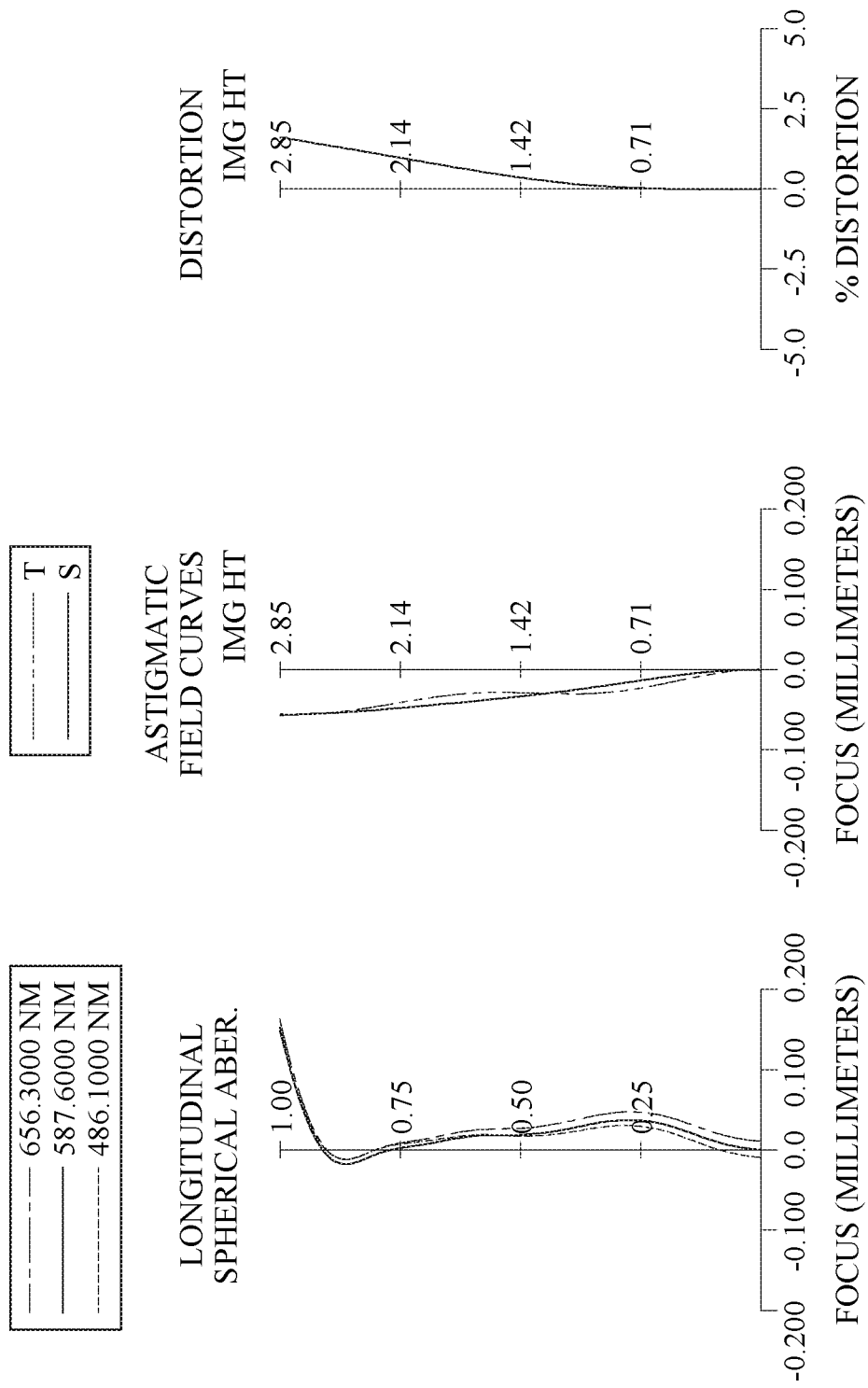
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging lens system (its reference numeral is omitted) of the present disclosure and an image sensor 270. The optical imaging lens system includes, in order from an object side to an image side, an aperture stop 200, a first lens element 210, a second lens element 220, a stop 201, a third lens element 230, a fourth lens element 240, a filter 250 and an image surface 260, wherein the optical imaging lens system has a total of four single and non-cemented lens elements (210-240).

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being concave in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric.

The fourth lens element 240 with negative refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric. Both the object-side surface 241 and the image-side surface 242 of the fourth lens element 240 have at least one inflection point.

The filter 250 is made of glass material and located between the fourth lens element 240 and the image surface 260, and will not affect the focal length of the optical imaging lens system. The image sensor 270 is disposed on or near the image surface 260 of the optical imaging lens system.

The detailed optical data of the 2nd embodiment are shown in Table 3 and the aspheric surface data are shown in Table 4 below.

TABLE 3

2nd Embodiment
f = 9.64 mm, Fno = 2.95, HFOV = 16.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.619 | | | | |
| 2 | Lens 1 | 2.384 (ASP) | 0.911 | Plastic | 1.544 | 55.9 | 5.38 |
| 3 | | 11.160 (ASP) | 0.253 | | | | |
| 4 | Lens 2 | −32.282 (ASP) | 1.988 | Plastic | 1.660 | 20.4 | −9.25 |
| 5 | | 7.711 (ASP) | 0.293 | | | | |
| 6 | Stop | Plano | 0.470 | | | | |

TABLE 3-continued

2nd Embodiment
f = 9.64 mm, Fno = 2.95, HFOV = 16.2 deg.

| Surface # | | Curvature Radius | | Thickness | Material | Index | Abbe # | Focal Length |
|---|---|---|---|---|---|---|---|---|
| 7 | Lens 3 | 11.656 | (ASP) | 0.860 | Plastic | 1.660 | 20.4 | 70.47 |
| 8 | | 15.098 | (ASP) | 0.239 | | | | |
| 9 | Lens 4 | −2.506 | (ASP) | 0.430 | Plastic | 1.544 | 55.9 | −24.75 |
| 10 | | −3.266 | (ASP) | 1.489 | | | | |
| 11 | Filter | Plano | | 0.300 | Glass | 1.517 | 64.2 | — |
| 12 | | Plano | | 2.285 | | | | |
| 13 | Image | Plano | | — | | | | |

Note:
Reference wavelength is 587.6 nm (d-line).
An effective radius of the stop 201 (Surface 6) is 1.100 mm.

TABLE 4

Aspheric Coefficients

| | Surface # | | | |
|---|---|---|---|---|
| | 2 | 3 | 4 | 5 |
| k = | 3.3861E−02 | 2.9059E+01 | −8.9542E+01 | −1.0587E+01 |
| A4 = | −7.0597E−04 | 3.5811E−03 | 2.4234E−03 | 2.2458E−03 |
| A6 = | 2.2146E−03 | −1.3424E−02 | 5.5133E−04 | 5.6958E−03 |
| A8 = | −7.5800E−03 | 1.4773E−02 | 1.4188E−03 | 1.2075E−03 |
| A10 = | 7.9679E−03 | −7.4323E−03 | −1.4242E−03 | −7.4678E−04 |
| A12 = | −4.1037E−03 | 1.6127E−03 | −2.6719E−04 | 7.3510E−04 |
| A14 = | 1.0135E−03 | −1.2852E−04 | 7.5007E−05 | — |
| A16 = | −1.0083E−04 | — | — | — |

| | Surface # | | | |
|---|---|---|---|---|
| | 7 | 8 | 9 | 10 |
| k = | −7.3430E+01 | 6.8441E+01 | −5.7705E−01 | −1.5298E−01 |
| A4 = | −5.3695E−02 | −6.3598E−02 | −1.1190E−02 | 4.8890E−03 |
| A6 = | −2.8868E−03 | 1.6849E−02 | 5.8669E−02 | 3.4486E−02 |
| A8 = | −7.1278E−03 | −6.1093E−03 | −2.3853E−02 | −1.9000E−02 |
| A10 = | 2.5735E−03 | 1.1830E−03 | 3.9414E−03 | 6.1914E−03 |
| A12 = | −6.2017E−04 | −1.1289E−04 | −6.9098E−05 | −1.3064E−03 |
| A14 = | 1.8422E−04 | 3.7518E−06 | −5.2175E−05 | 1.5715E−04 |
| A16 = | — | — | 4.2396E−06 | −7.9016E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 9.64 | |R8/f| | 0.34 |
| Fno | 2.95 | f1/CT2 | 2.71 |
| HFOV [deg.] | 16.2 | |f2/f4| | 0.37 |
| 1/sin(HFOV) | 3.58 | (|P3| + |P4|)/(|P1| + |P2|) | 0.19 |
| V2 | 20.4 | |(2*Y42)/EPD| | 0.97 |
| V3 | 20.4 | ImgH/EPD | 0.87 |
| V2 + V3 | 40.8 | ΣAT/BL | 0.31 |
| CT1/CT2 | 0.46 | SAG41/SAG31 | 3.11 |
| CT4/CT2 | 0.22 | f/Yc42 | 10.83 |
| (CT3 + CT4)/CT2 | 0.65 | 2*arctan(ImgH/2f) | 0.29 |
| TD/CT2 | 2.74 | SDmax/SDmin | 1.56 |
| (R7 + R8)/(R7 − R8) | −7.60 | — | — |

3rd Embodiment

Figure 5:
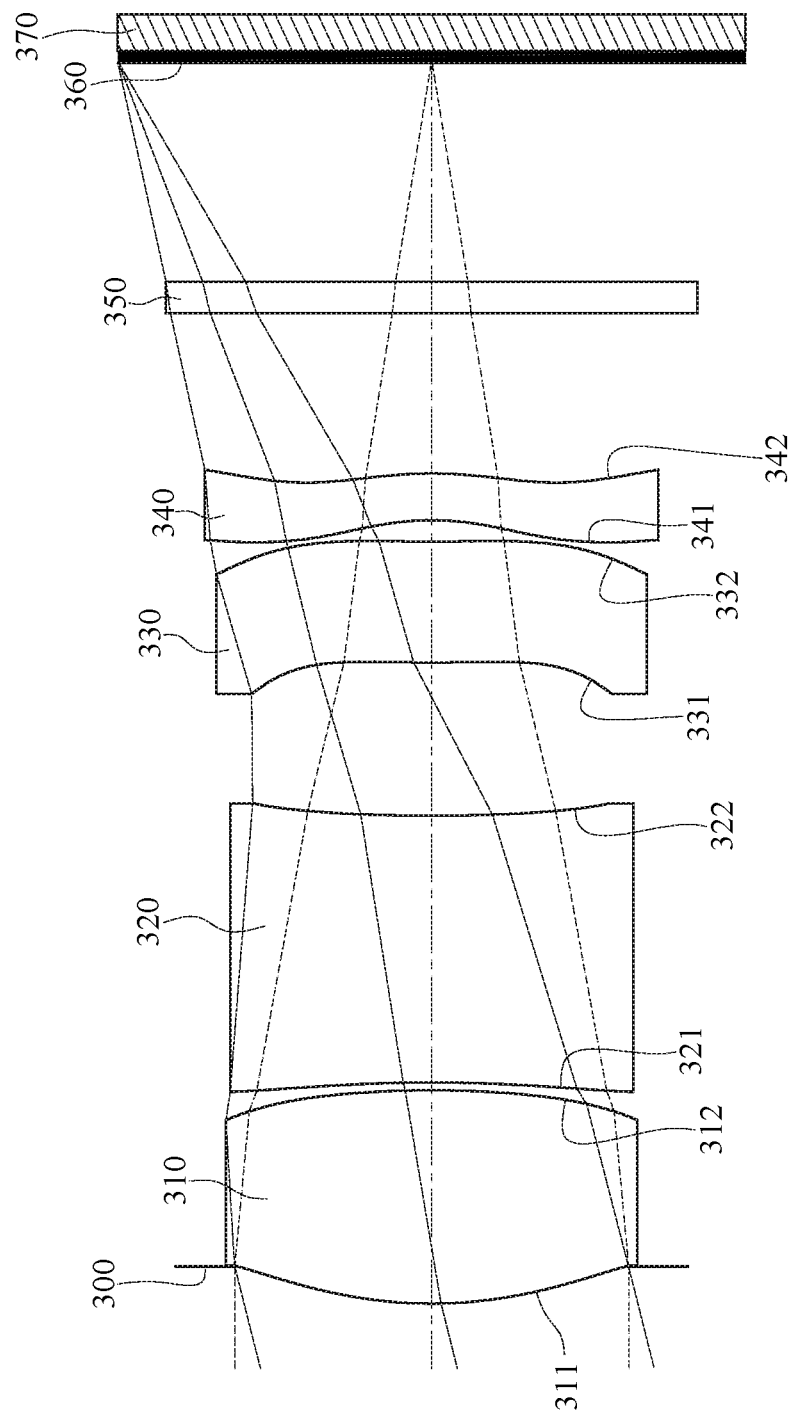
FIG. 5 is a schematic view of an image capturing unit according to the 3rd embodiment of the present disclosure.
Figure 6:
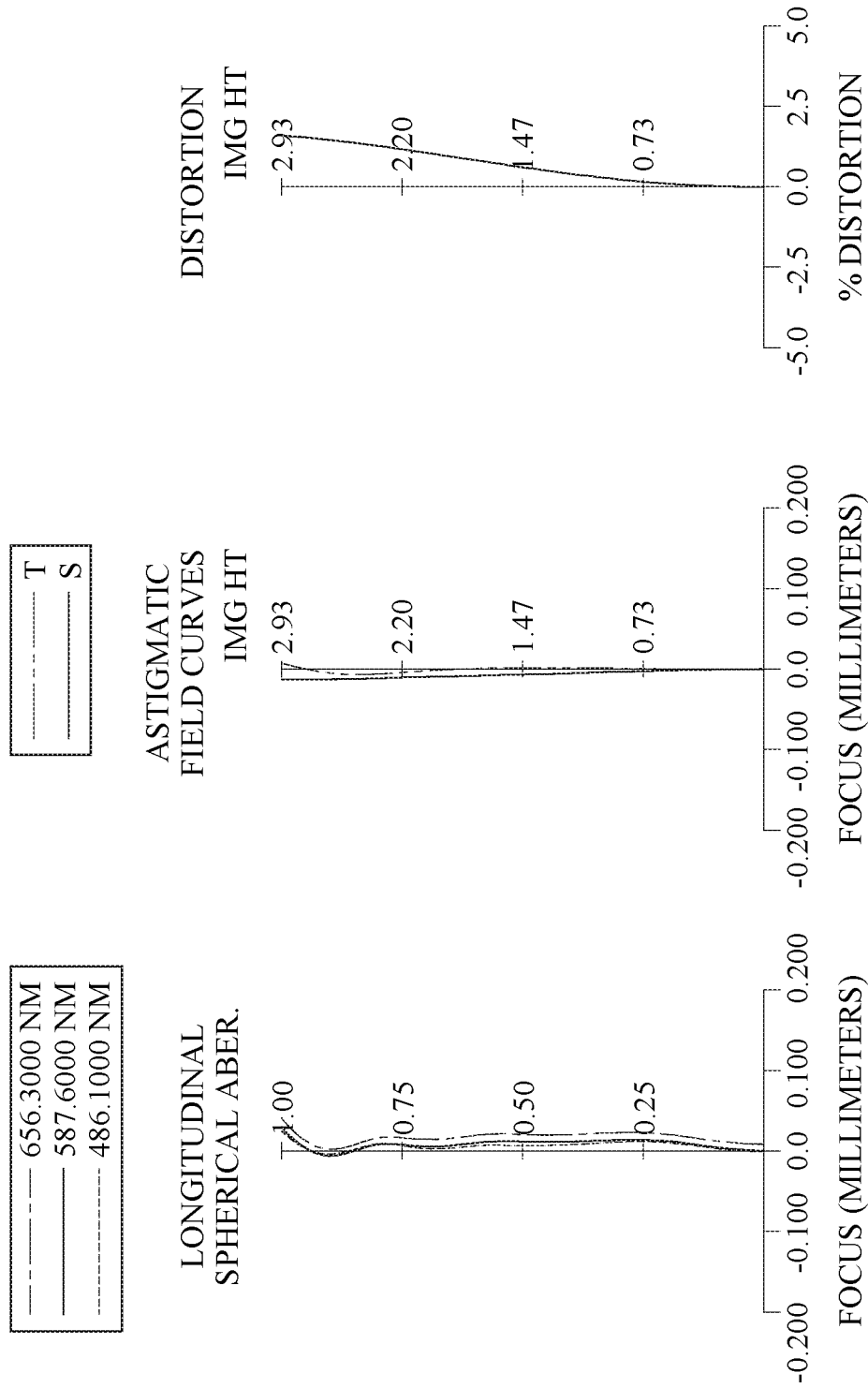
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging lens system (its reference numeral is omitted) of the present disclosure and an image sensor 370. The optical imaging lens system includes, in order from an object side to an image side, an aperture stop 300, a first lens element 310, a second lens element 320, a third lens element 330, a fourth lens element 340, a filter 350 and an image surface 360, wherein the optical imaging lens system has a total of four single and non-cemented lens elements (310-340).

The first lens element 310 with positive refractive power has an object-side surface 311 being convex in a paraxial region thereof and an image-side surface 312 being convex in a paraxial region thereof. The first lens element 310 is made of plastic material and has the object-side surface 311 and the image-side surface 312 being both aspheric.

The second lens element 320 with negative refractive power has an object-side surface 321 being concave in a paraxial region thereof and an image-side surface 322 being concave in a paraxial region thereof. The second lens element 320 is made of plastic material and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric.

The fourth lens element 340 with negative refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric. Both the object-side surface 341 and the image-side surface 342 of the fourth lens element 340 have at least one inflection point.

The filter 350 is made of glass material and located between the fourth lens element 340 and the image surface 360, and will not affect the focal length of the optical imaging lens system. The image sensor 370 is disposed on or near the image surface 360 of the optical imaging lens system.

The detailed optical data of the 3rd embodiment are shown in Table 5 and the aspheric surface data are shown in Table 6 below.

TABLE 5

3rd Embodiment
f = 11.43 mm, Fno = 3.10, HFOV = 14.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.346 | | | | |
| 2 | Lens 1 | 4.167 | (ASP) | 2.000 | Plastic | 1.545 | 56.0 | 5.63 |
| 3 | | −9.655 | (ASP) | 0.074 | | | | |
| 4 | Lens 2 | −12.241 | (ASP) | 2.500 | Plastic | 1.639 | 23.5 | −10.71 |
| 5 | | 16.719 | (ASP) | 1.438 | | | | |
| 6 | Lens 3 | 15.978 | (ASP) | 1.132 | Plastic | 1.639 | 23.5 | −961.58 |
| 7 | | 15.143 | (ASP) | 0.201 | | | | |
| 8 | Lens 4 | −2.507 | (ASP) | 0.438 | Plastic | 1.544 | 55.9 | −15.23 |
| 9 | | −3.817 | (ASP) | 1.500 | | | | |
| 10 | Filter | Plano | | 0.300 | Glass | 1.517 | 64.2 | — |
| 11 | | Plano | | 2.051 | | | | |
| 12 | Image | Plano | | — | | | | |

Note:
Reference wavelength is 587.6 nm (d-line).

TABLE 6

Aspheric Coefficients

| | Surface # | | | |
|---|---|---|---|---|
| | 2 | 3 | 4 | 5 |
| k = | 5.0562E−02 | 4.5312E−01 | −4.8023E+00 | −4.9483E+01 |
| A4 = | −3.9118E−03 | 1.2709E−03 | 7.9279E−03 | 2.9258E−03 |
| A6 = | 7.9392E−04 | −3.1221E−03 | −2.0429E−03 | 8.7172E−04 |
| A8 = | −1.8563E−04 | 4.6942E−04 | 4.0149E−04 | 2.9654E−06 |
| A10 = | 1.2773E−03 | −2.0595E−04 | −2.2402E−04 | −8.3816E−05 |
| A12 = | −5.0420E−04 | 7.6956E−05 | 9.3820E−05 | 2.6653E−05 |
| A14 = | 1.0066E−04 | −8.9898E−06 | −1.1378E−05 | — |
| A16 = | −8.0525E−06 | — | — | — |

| | Surface # | | | |
|---|---|---|---|---|
| | 6 | 7 | 8 | 9 |
| k = | 3.4267E+01 | −3.9937E+01 | −5.6607E−01 | −6.6774E−01 |
| A4 = | −4.1184E−02 | −5.3526E−02 | 3.2170E−02 | 4.3171E−02 |
| A6 = | −9.8692E−04 | 1.8193E−02 | 4.5673E−02 | 2.1565E−02 |
| A8 = | −4.3264E−03 | −6.1437E−03 | −3.2558E−02 | −1.7575E−02 |
| A10 = | 2.7767E−03 | 1.1931E−03 | 1.0819E−02 | 5.5776E−03 |

TABLE 6-continued

| Aspheric Coefficients | | | | |
|---|---|---|---|---|
| A12 = | −8.0304E−04 | −1.0430E−04 | −2.0364E−03 | −9.7258E−04 |
| A14 = | 9.9759E−05 | 3.3327E−06 | 2.0844E−04 | 8.9675E−05 |
| A16 = | — | — | −8.9550E−06 | −3.3269E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 11.43 | |R8/f| | 0.33 |
| Fno | 3.10 | f1/CT2 | 2.25 |
| HFOV [deg.] | 14.1 | |f2/f4| | 0.70 |
| 1/sin(HFOV) | 4.10 | (|P3| + |P4|)/(|P1| + |P2|) | 0.25 |
| V2 | 23.5 | |(2 * Y42)/EPD| | 1.15 |
| V3 | 23.5 | ImgH/EPD | 0.80 |
| V2 + V3 | 47.0 | ΣAT/BL | 0.44 |
| CT1/CT2 | 0.80 | SAG41/SAG31 | 0.63 |
| CT4/CT2 | 0.18 | f/Yc42 | 17.87 |
| (CT3 + CT4)/CT2 | 0.63 | 2 * arctan(ImgH/2f) | 0.26 |
| TD/CT2 | 3.11 | SDmax/SDmin | 1.27 |
| (R7 + R8)/(R7 − R8) | −4.83 | — | — |

4th Embodiment

Figure 7:
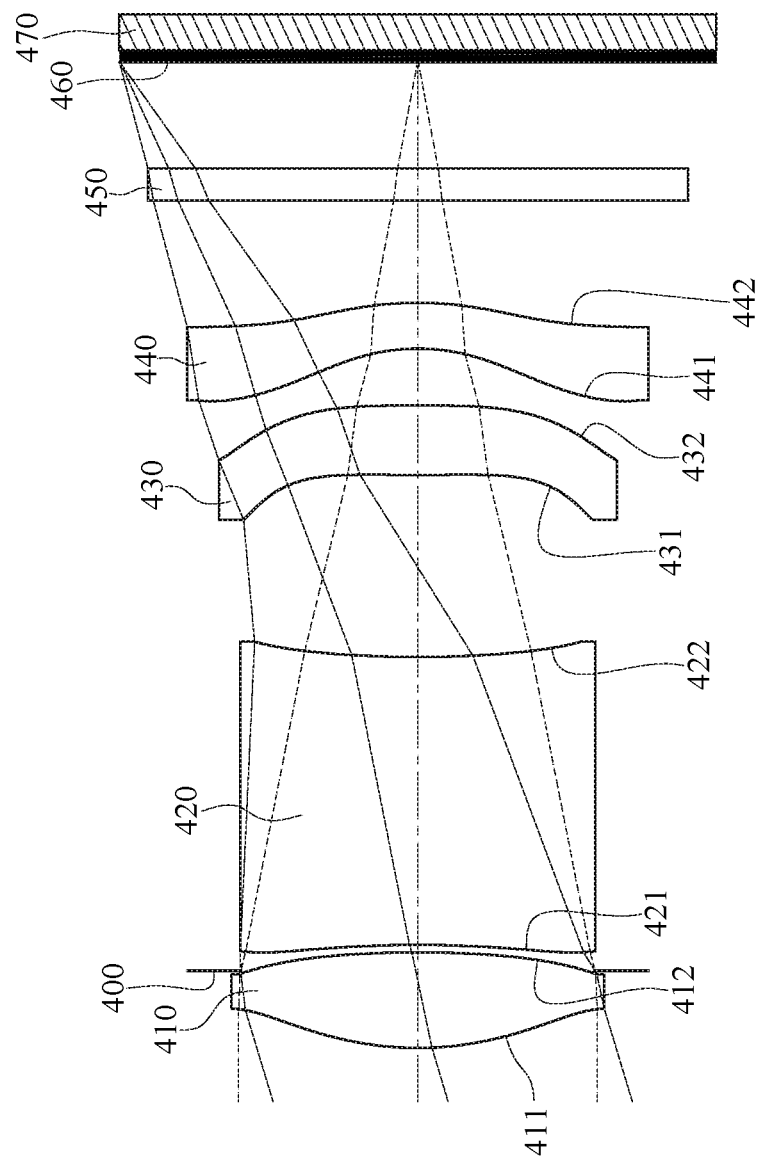
FIG. 7 is a schematic view of an image capturing unit according to the 4th embodiment of the present disclosure.
Figure 8:
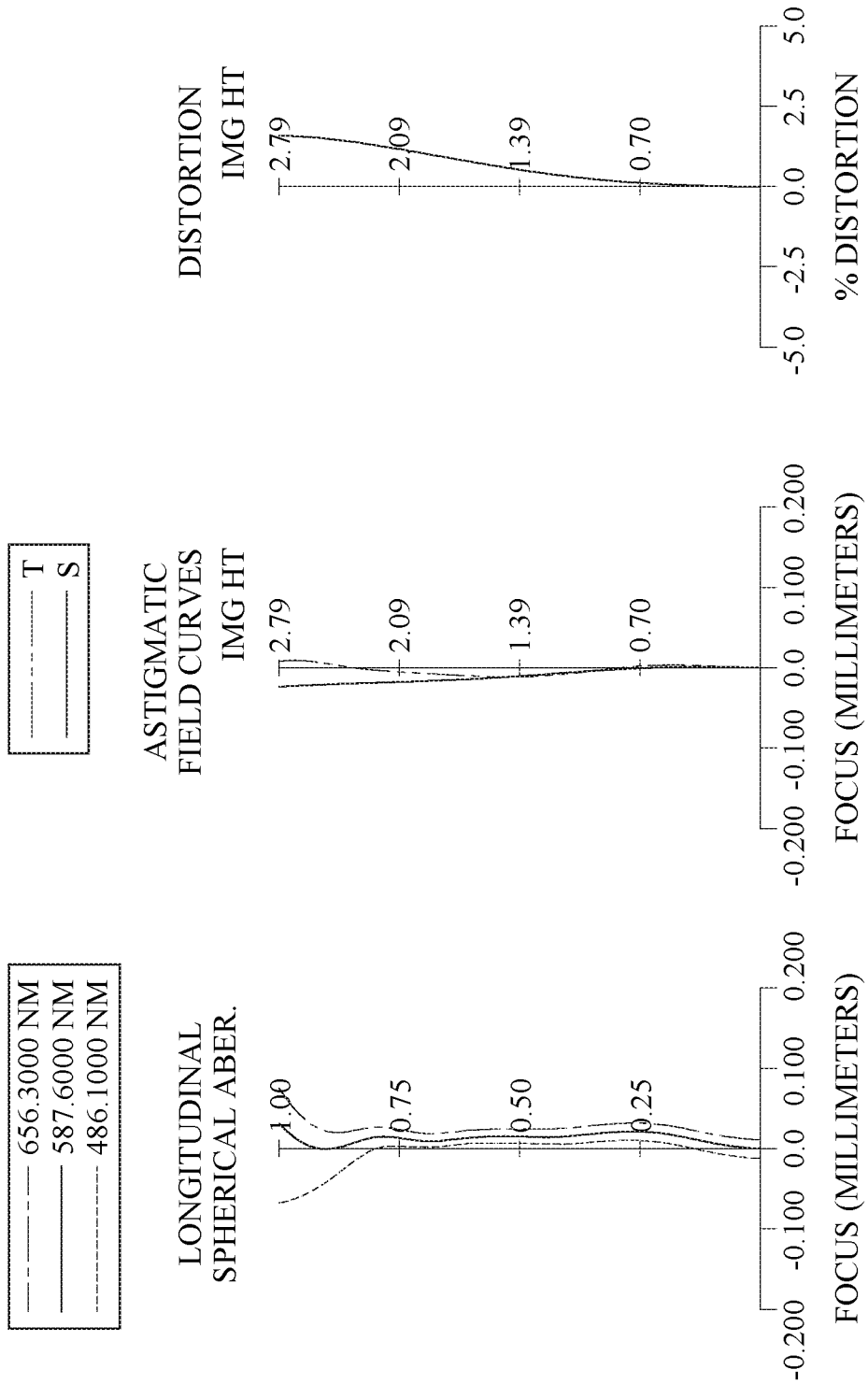
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical imaging lens system (its reference numeral is omitted) of the present disclosure and an image sensor 470. The optical imaging lens system includes, in order from an object side to an image side, a first lens element 410, an aperture stop 400, a second lens element 420, a third lens element 430, a fourth lens element 440, a filter 450 and an image surface 460, wherein the optical imaging lens system has a total of four single and non-cemented lens elements (410-440).

The first lens element 410 with positive refractive power has an object-side surface 411 being convex in a paraxial region thereof and an image-side surface 412 being convex in a paraxial region thereof. The first lens element 410 is made of plastic material and has the object-side surface 411 and the image-side surface 412 being both aspheric.

The second lens element 420 with negative refractive power has an object-side surface 421 being concave in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric.

The fourth lens element 440 with negative refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric. Both the object-side surface 441 and the image-side surface 442 of the fourth lens element 440 have at least one inflection point.

The filter 450 is made of glass material and located between the fourth lens element 440 and the image surface 460, and will not affect the focal length of the optical imaging lens system. The image sensor 470 is disposed on or near the image surface 460 of the optical imaging lens system.

The detailed optical data of the 4th embodiment are shown in Table 7 and the aspheric surface data are shown in Table 8 below.

TABLE 7

4th Embodiment
f = 9.07 mm, Fno = 2.70, HFOV = 16.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.054 | (ASP) | 0.896 | Plastic | 1.515 | 56.5 | 4.70 |
| 2 | | −10.438 | (ASP) | −0.175 | | | | |
| 3 | Ape. Stop | Plano | | 0.245 | | | | |
| 4 | Lens 2 | −10.929 | (ASP) | 2.700 | Plastic | 1.607 | 26.6 | −8.70 |
| 5 | | 11.177 | (ASP) | 1.707 | | | | |
| 6 | Lens 3 | 25.390 | (ASP) | 0.651 | Plastic | 1.660 | 20.4 | 21.62 |
| 7 | | −32.258 | (ASP) | 0.533 | | | | |
| 8 | Lens 4 | −1.903 | (ASP) | 0.430 | Plastic | 1.607 | 26.6 | −8.53 |
| 9 | | −3.265 | (ASP) | 0.958 | | | | |
| 10 | Filter | Plano | | 0.300 | Glass | 1.510 | 64.2 | — |

TABLE 7-continued

4th Embodiment
f = 9.07 mm, Fno = 2.70, HFOV = 16.8 deg.

| Surface # | | Curvature Radius | Thickness | Material | Index | Abbe # | Focal Length |
|---|---|---|---|---|---|---|---|
| 11 | | Plano | 0.998 | | | | |
| 12 | Image | Plano | — | | | | |

Note:
Reference wavelength is 587.6 nm (d-line).

TABLE 8

Aspheric Coefficients

| Surface # | | | | |
|---|---|---|---|---|
| | 1 | 2 | 4 | 5 |
| k = | −1.3192E+00 | 5.3544E+00 | 2.5481E+01 | 1.2775E+01 |
| A4 = | −9.8849E−04 | −3.4092E−03 | 4.7673E−03 | 1.3879E−03 |
| A6 = | 3.9763E−03 | −2.9437E−03 | −1.4014E−04 | 3.3014E−03 |
| A8 = | −8.8399E−03 | 1.1507E−03 | 5.8290E−04 | −2.5224E−03 |
| A10 = | 7.3110E−03 | −8.3361E−04 | −2.9761E−04 | 1.3061E−03 |
| A12 = | −3.5920E−03 | 3.1932E−04 | 3.9248E−04 | −2.1653E−04 |
| A14 = | 8.3063E−04 | −3.9147E−05 | −7.7933E−05 | — |
| A16 = | −7.1313E−05 | — | — | — |

| Surface # | | | | |
|---|---|---|---|---|
| | 6 | 7 | 8 | 9 |
| k = | −9.0000E+01 | 9.0000E+01 | −8.1251E−01 | −2.2018E−01 |
| A4 = | −4.9379E−02 | −6.8160E−02 | −4.1480E−02 | −6.7705E−03 |
| A6 = | 1.8272E−03 | 1.7859E−02 | 9.5555E−02 | 4.9619E−02 |
| A8 = | −7.5672E−03 | −6.0551E−03 | −5.1082E−02 | −2.5663E−02 |
| A10 = | 2.2661E−03 | 1.1533E−03 | 1.5871E−02 | 6.8455E−03 |
| A12 = | −7.2849E−04 | −9.1198E−05 | −2.9936E−03 | −1.0549E−03 |
| A14 = | 1.9312E−04 | 1.2551E−05 | 3.1767E−04 | 8.8737E−05 |
| A16 = | — | — | −1.4480E−05 | −3.0950E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 9.07 | |R8/f| | 0.36 |
| Fno | 2.70 | f1/CT2 | 1.74 |
| HFOV [deg.] | 16.8 | |f2/f4| | 1.02 |
| 1/sin(HFOV) | 3.46 | (|P3| + |P4|)/(|P1| + |P2|) | 0.50 |
| V2 | 26.6 | |(2 * Y42)/EPD| | 1.29 |
| V3 | 20.4 | ImgH/EPD | 0.83 |
| V2 + V3 | 47.0 | ΣAT/BL | 1.02 |
| CT1/CT2 | 0.33 | SAG41/SAG31 | 1.15 |
| CT4/CT2 | 0.16 | f/Yc42 | 10.48 |
| (CT3 + CT4)/CT2 | 0.40 | 2 * arctan(ImgH/2f) | 0.31 |
| TD/CT2 | 2.59 | SDmax/SDmin | 1.41 |
| (R7 + R8)/(R7 − R8) | −3.79 | — | — |

5th Embodiment

Figure 9:
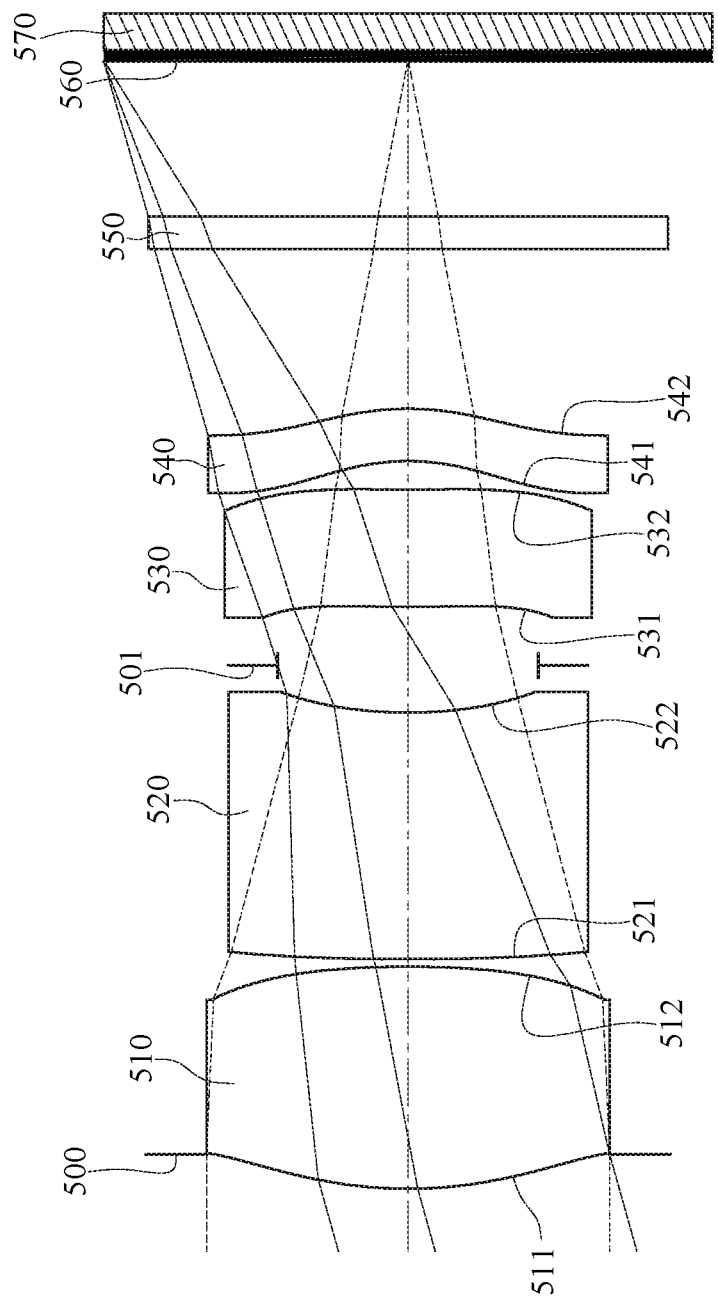
FIG. 9 is a schematic view of an image capturing unit according to the 5th embodiment of the present disclosure.
Figure 10:
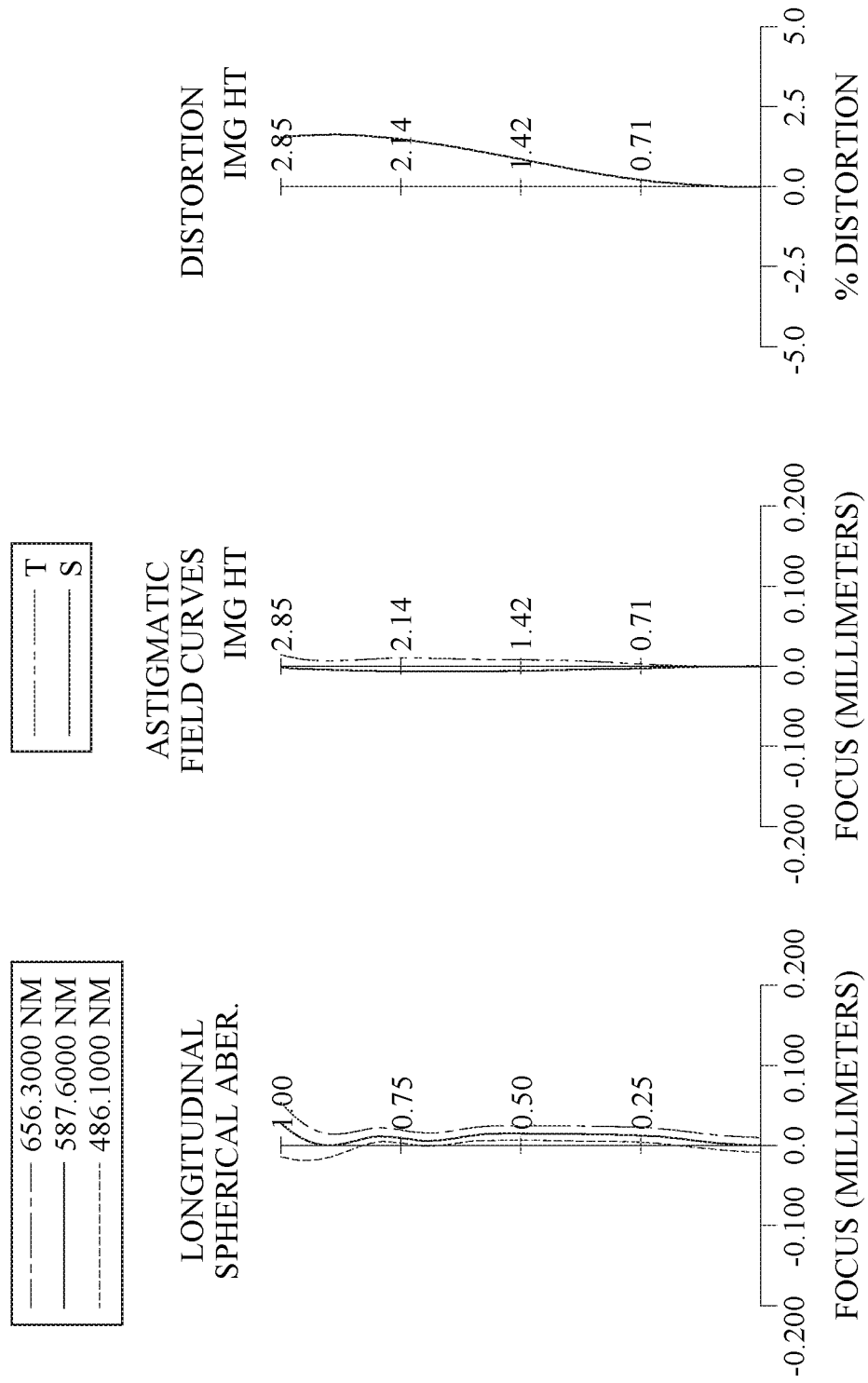
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical imaging lens system (its reference numeral is omitted) of the present disclosure and an image sensor 570. The optical imaging lens system includes, in order from an object side to an image side, an aperture stop 500, a first lens element 510, a second lens element 520, a stop 501, a third lens element 530, a fourth lens element 540, a filter 550 and an image surface 560, wherein the optical imaging lens system has a total of four single and non-cemented lens elements (510-540).

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric.

The fourth lens element 540 with negative refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric. Both the object-side surface 541 and the image-side surface 542 of the fourth lens element 540 have at least one inflection point.

The filter 550 is made of glass material and located between the fourth lens element 540 and the image surface 560, and will not affect the focal length of the optical imaging lens system. The image sensor 570 is disposed on or near the image surface 560 of the optical imaging lens system.

The detailed optical data of the 5th embodiment are shown in Table 9 and the aspheric surface data are shown in Table 10 below.

TABLE 9

5th Embodiment
f = 10.01 mm, Fno = 2.65, HFOV = 15.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.322 | | | | |
| 2 | Lens 1 | 4.068 | (ASP) | 2.083 | Plastic | 1.515 | 56.5 | 5.79 |
| 3 | | −9.203 | (ASP) | 0.070 | | | | |
| 4 | Lens 2 | 27.027 | (ASP) | 2.312 | Plastic | 1.660 | 20.4 | −7.86 |
| 5 | | 4.203 | (ASP) | 0.441 | | | | |
| 6 | Stop | Plano | | 0.550 | | | | |
| 7 | Lens 3 | 14.613 | (ASP) | 1.100 | Plastic | 1.660 | 20.4 | 61.74 |
| 8 | | 22.104 | (ASP) | 0.267 | | | | |
| 9 | Lens 4 | −2.144 | (ASP) | 0.491 | Plastic | 1.544 | 55.9 | −38.59 |
| 10 | | −2.580 | (ASP) | 1.500 | | | | |
| 11 | Filter | Plano | | 0.300 | Glass | 1.517 | 64.2 | — |
| 12 | | Plano | | 1.455 | | | | |
| 13 | Image | Plano | | — | | | | |

Note:
Reference wavelength is 587.6 nm (d-line).
An effective radius of the stop 501 (Surface 6) is 1.220 mm.

TABLE 10

Aspheric Coefficients

| | Surface # | | | |
|---|---|---|---|---|
| | 2 | 3 | 4 | 5 |
| k = | −3.6076E−01 | 1.6002E+01 | −9.0000E+01 | 3.7709E+00 |
| A4 = | −4.8605E−03 | −2.6441E−03 | 4.8172E−03 | −4.7071E−04 |
| A6 = | 5.4652E−04 | −3.2403E−03 | −1.9032E−03 | 2.3560E−03 |
| A8 = | −1.8881E−03 | 8.9801E−04 | 6.5221E−04 | −5.9822E−05 |
| A10 = | 1.2782E−03 | −1.3509E−04 | −2.3251E−04 | −2.0846E−04 |
| A12 = | −5.0475E−04 | 1.7644E−05 | 7.8595E−05 | 1.2164E−04 |
| A14 = | 9.9403E−05 | −8.8040E−07 | −9.6523E−06 | — |
| A16 = | −7.8080E−06 | — | — | — |

| | Surface # | | | |
|---|---|---|---|---|
| | 7 | 8 | 9 | 10 |
| k = | 4.2592E+01 | 4.7501E+01 | −7.2004E−01 | −5.8392E−01 |
| A4 = | −4.4567E−02 | −5.5462E−02 | 7.4794E−03 | 2.2963E−02 |
| A6 = | 3.8927E−04 | 1.8235E−02 | 6.2497E−02 | 3.0435E−02 |
| A8 = | −5.0241E−03 | −6.0498E−03 | −3.5463E−02 | −1.6170E−02 |
| A10 = | 2.7218E−03 | 1.1884E−03 | 1.0205E−02 | 3.8909E−03 |
| A12 = | −7.8515E−04 | −1.0509E−04 | −1.6639E−03 | −5.1482E−04 |
| A14 = | 1.1479E−04 | 3.2857E−06 | 1.4694E−04 | 3.6222E−05 |
| A16 = | — | — | −5.4724E−06 | −1.0223E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 10.01 | \|R8/f\| | 0.26 |
| Fno | 2.65 | f1/CT2 | 2.50 |
| HFOV [deg.] | 15.6 | \|f2/f4\| | 0.20 |
| 1/sin(HFOV) | 3.72 | (\|P3\| + \|P4\|)/(\|P1\| + \|P2\|) | 0.14 |
| V2 | 20.4 | \|(2 * Y42)/EPD\| | 0.99 |
| V3 | 20.4 | ImgH/EPD | 0.75 |
| V2 + V3 | 40.8 | ΣAT/BL | 0.41 |
| CT1/CT2 | 0.90 | SAG41/SAG31 | 2.92 |
| CT4/CT2 | 0.21 | f/Yc42 | 11.78 |
| (CT3 + CT4)/CT2 | 0.69 | 2 * arctan(ImgH/2f) | 0.28 |
| TD/CT2 | 3.16 | SDmax/SDmin | 1.66 |
| (R7 + R8)/(R7 − R8) | −10.82 | — | — |

6th Embodiment

Figure 11:
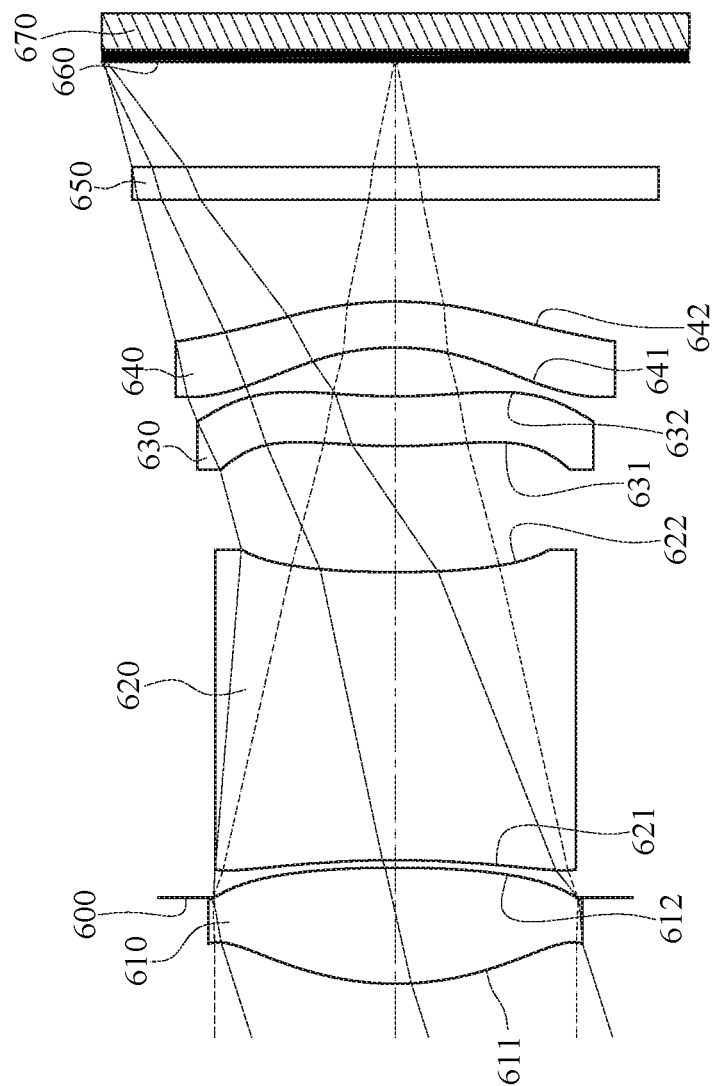
FIG. 11 is a schematic view of an image capturing unit according to the 6th embodiment of the present disclosure.
Figure 12:
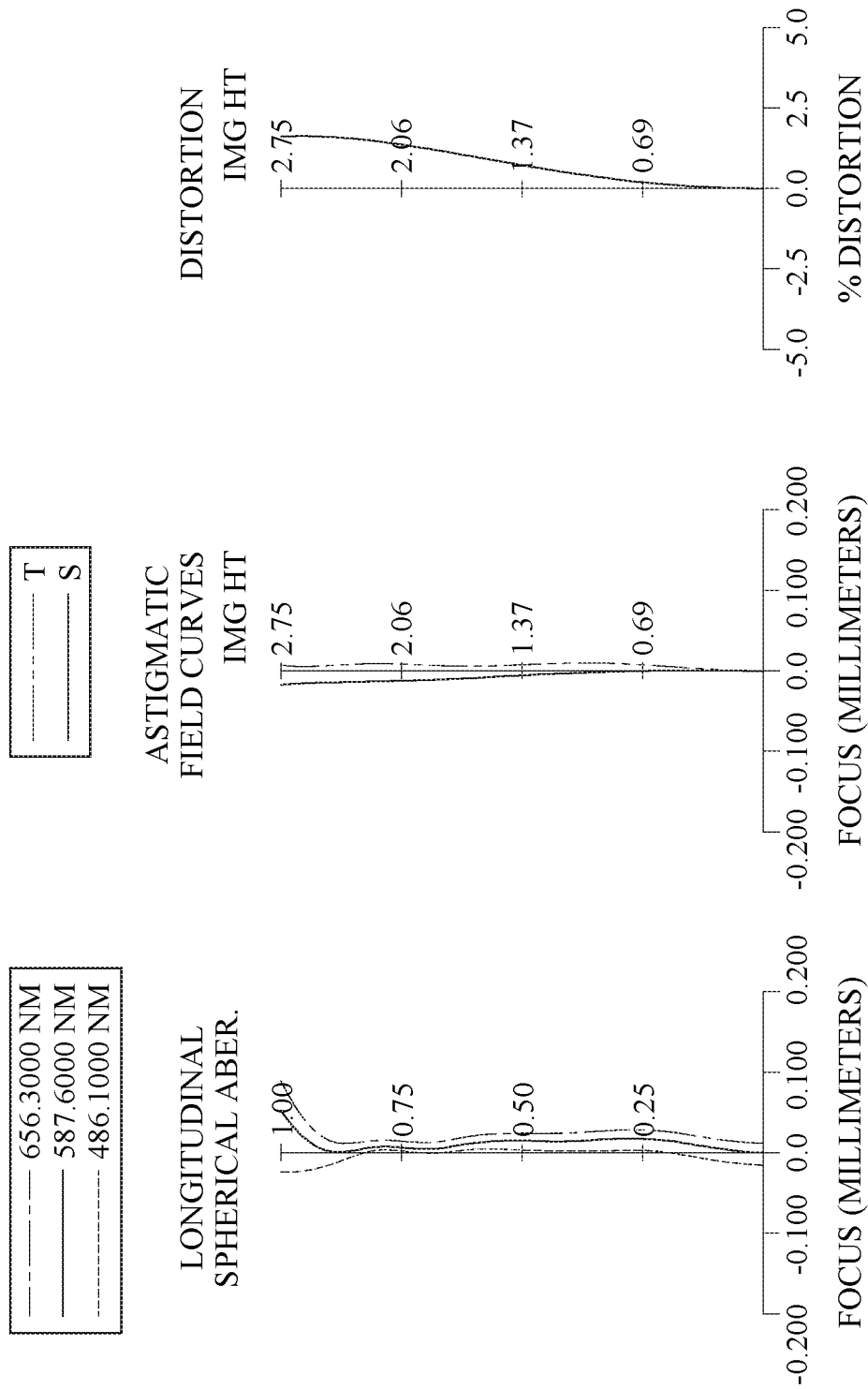
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging lens system (its reference numeral is omitted) of the present disclosure and an image sensor 670. The optical imaging lens system includes, in order from an object side to an image side, a first lens element 610, an aperture stop 600, a second lens element 620, a third lens element 630, a fourth lens element 640, a filter 650 and an image surface 660, wherein the optical imaging lens system has a total of four single and non-cemented lens elements (610-640).

The first lens element 610 with positive refractive power has an object-side surface 611 being convex in a paraxial region thereof and an image-side surface 612 being convex in a paraxial region thereof. The first lens element 610 is made of plastic material and has the object-side surface 611 and the image-side surface 612 being both aspheric.

The second lens element 620 with negative refractive power has an object-side surface 621 being concave in a paraxial region thereof and an image-side surface 622 being concave in a paraxial region thereof. The second lens element 620 is made of plastic material and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric.

The fourth lens element 640 with negative refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric. Both the object-side surface 641 and the image-side surface 642 of the fourth lens element 640 have at least one inflection point.

The filter 650 is made of glass material and located between the fourth lens element 640 and the image surface 660, and will not affect the focal length of the optical imaging lens system. The image sensor 670 is disposed on or near the image surface 660 of the optical imaging lens system.

The detailed optical data of the 6th embodiment are shown in Table 11 and the aspheric surface data are shown in Table 12 below.

TABLE 11

6th Embodiment
f = 8.41 mm, Fno = 2.48, HFOV = 17.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.798 | (ASP) | 1.089 | Plastic | 1.515 | 56.5 | 4.34 |
| 2 | | −9.605 | (ASP) | −0.280 | | | | |
| 3 | Ape. Stop | Plano | | 0.350 | | | | |
| 4 | Lens 2 | −9.195 | (ASP) | 2.700 | Plastic | 1.607 | 26.6 | −7.40 |
| 5 | | 9.753 | (ASP) | 1.182 | | | | |
| 6 | Lens 3 | 5.445 | (ASP) | 0.466 | Plastic | 1.660 | 20.4 | −265.69 |
| 7 | | 5.102 | (ASP) | 0.459 | | | | |
| 8 | Lens 4 | −2.371 | (ASP) | 0.430 | Plastic | 1.544 | 55.9 | −15.55 |
| 9 | | −3.505 | (ASP) | 0.958 | | | | |
| 10 | Filter | Plano | | 0.300 | Glass | 1.510 | 64.2 | — |
| 11 | | Plano | | 0.989 | | | | |
| 12 | Image | Plano | | — | | | | |

Note:
Reference wavelength is 587.6 nm (d-line).

TABLE 12

Aspheric Coefficients

| Surface # | | | | |
|---|---|---|---|---|
| | 1 | 2 | 4 | 5 |
| k = | −1.2681E+00 | 7.2575E+00 | 1.5714E+01 | 2.6822E+01 |
| A4 = | 5.9041E−04 | −2.7686E−03 | 7.0079E−03 | 6.6675E−03 |
| A6 = | 3.0563E−03 | −2.8757E−03 | 2.8595E−04 | 3.3530E−03 |
| A8 = | −7.5902E−03 | 5.5663E−04 | 7.2772E−04 | 1.1274E−03 |
| A10 = | 5.8148E−03 | −1.2066E−03 | −1.2254E−03 | −8.2818E−04 |
| A12 = | −2.6458E−03 | 4.8806E−04 | 6.5938E−04 | 4.0842E−04 |
| A14 = | 5.5685E−04 | −6.5615E−05 | −9.0533E−05 | — |
| A16 = | −4.8340E−05 | — | — | — |

| Surface # | | | | |
|---|---|---|---|---|
| | 6 | 7 | 8 | 9 |
| k = | −2.6338E+00 | 4.2232E+00 | −5.2139E−01 | −3.1495E−01 |
| A4 = | −5.5894E−02 | −7.1609E−02 | −2.1907E−02 | −7.9344E−03 |
| A6 = | 7.2415E−03 | 1.3664E−02 | 2.9287E−02 | 1.6792E−02 |
| A8 = | −7.6254E−03 | −6.1470E−03 | −2.8888E−03 | −4.0898E−03 |
| A10 = | 2.1330E−03 | 1.2629E−03 | −1.8073E−03 | 2.6185E−04 |
| A12 = | −6.8344E−04 | −9.2164E−05 | 5.9060E−04 | 6.5490E−05 |
| A14 = | 1.5651E−04 | 4.6431E−06 | −6.0488E−05 | −2.0311E−05 |
| A16 = | — | — | 1.7487E−06 | 2.0687E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 8.41 | |R8/f| | 0.42 |
| Fno | 2.48 | f1/CT2 | 1.61 |
| HFOV [deg.] | 17.8 | |f2/f4| | 0.48 |
| 1/sin(HFOV) | 3.27 | (|P3| + |P4|)/(|P1| + |P2|) | 0.19 |
| V2 | 26.6 | |(2 * Y42)/EPD| | 1.21 |
| V3 | 20.4 | ImgH/EPD | 0.81 |
| V2 + V3 | 47.0 | ΣAT/BL | 0.76 |
| CT1/CT2 | 0.40 | SAG41/SAG31 | 2.05 |
| CT4/CT2 | 0.16 | f/Yc42 | 7.25 |
| (CT3 + CT4)/CT2 | 0.33 | 2 * arctan(ImgH/2f) | 0.32 |
| TD/CT2 | 2.37 | SDmax/SDmin | 1.43 |
| (R7 + R8)/(R7 − R8) | −5.18 | — | — |

7th Embodiment

Figure 13:
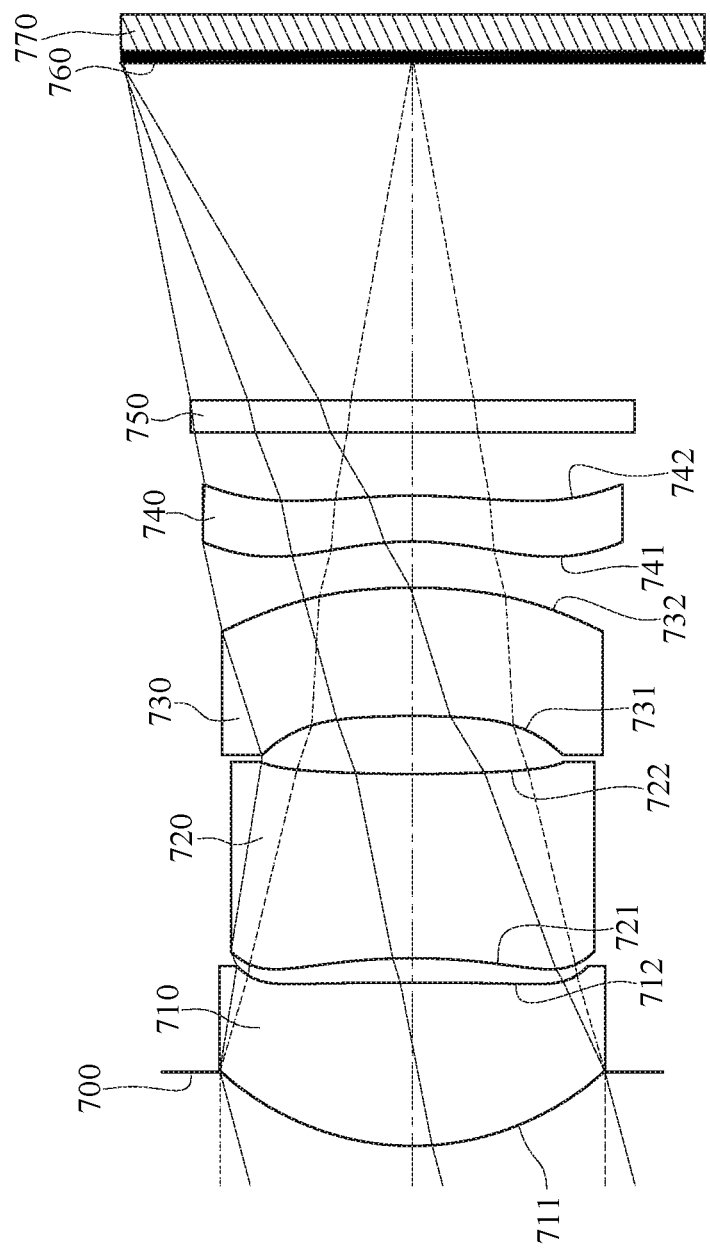
FIG. 13 is a schematic view of an image capturing unit according to the 7th embodiment of the present disclosure.
Figure 14:
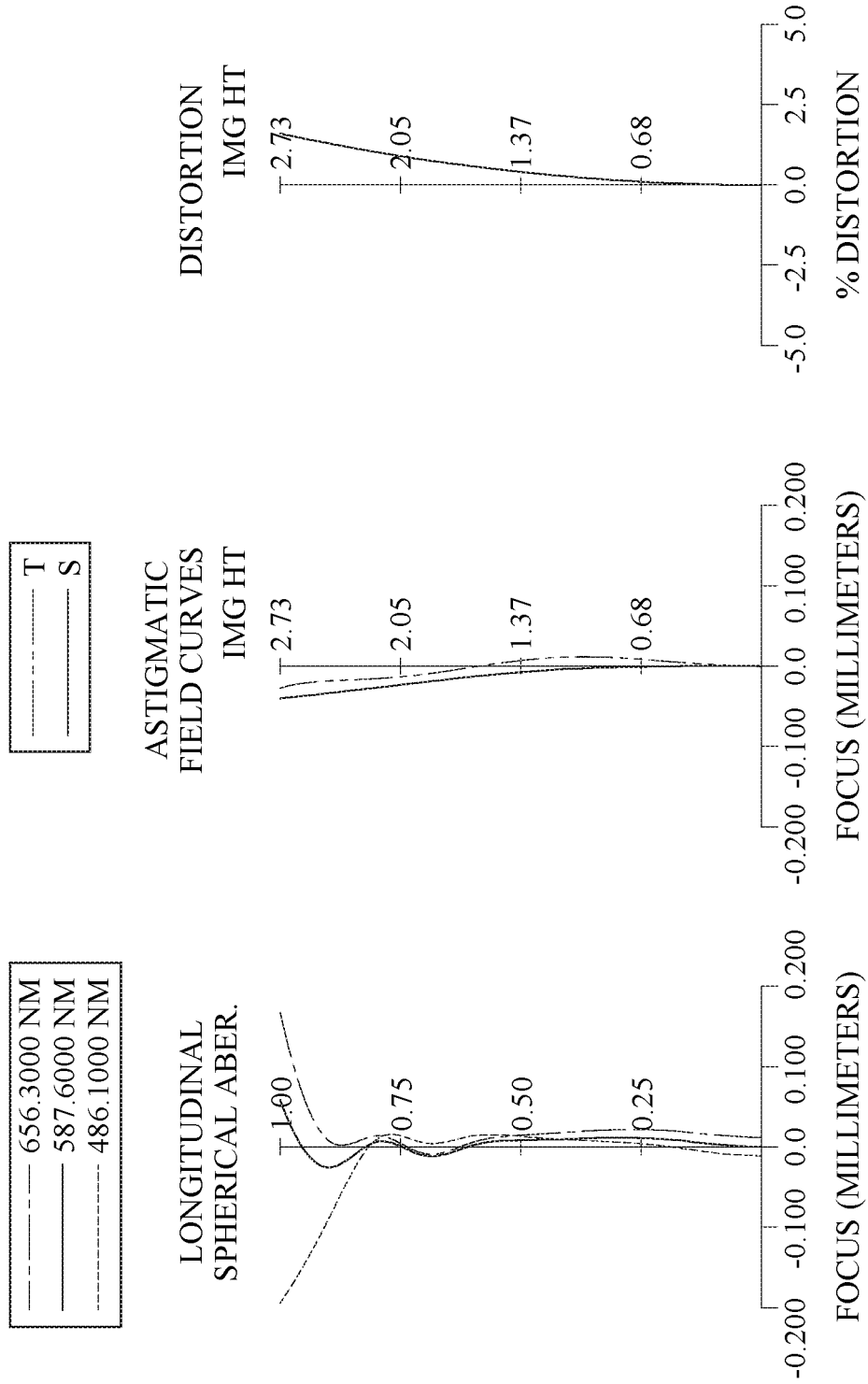
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical imaging lens system (its reference numeral is omitted) of the present disclosure and an image sensor 770. The optical imaging lens system includes, in order from an object side to an image side, an aperture stop 700, a first lens element 710, a second lens element 720, a third lens element 730, a fourth lens element 740, a filter 750 and an image surface 760, wherein the optical imaging lens system has a total of four single and non-cemented lens elements (710-740).

The first lens element 710 with positive refractive power has an object-side surface 711 being convex in a paraxial region thereof and an image-side surface 712 being convex in a paraxial region thereof. The first lens element 710 is made of plastic material and has the object-side surface 711 and the image-side surface 712 being both aspheric.

The second lens element 720 with negative refractive power has an object-side surface 721 being concave in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric.

The fourth lens element 740 with negative refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric. Both the object-side surface 741 and the image-side surface 742 of the fourth lens element 740 have at least one inflection point.

The filter 750 is made of glass material and located between the fourth lens element 740 and the image surface 760, and will not affect the focal length of the optical imaging lens system. The image sensor 770 is disposed on or near the image surface 760 of the optical imaging lens system.

The detailed optical data of the 7th embodiment are shown in Table 13 and the aspheric surface data are shown in Table 14 below.

TABLE 13

7th Embodiment
f = 10.09 mm, Fno = 2.80, HFOV = 14.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.695 | | | | |
| 2 | Lens 1 | 2.594 | (ASP) | 1.531 | Plastic | 1.544 | 56.0 | 4.63 |
| 3 | | −70.682 | (ASP) | 0.229 | | | | |
| 4 | Lens 2 | −5.730 | (ASP) | 1.728 | Plastic | 1.607 | 26.6 | −6.80 |
| 5 | | 16.486 | (ASP) | 0.542 | | | | |
| 6 | Lens 3 | −12.970 | (ASP) | 1.204 | Plastic | 1.660 | 20.4 | 14.14 |
| 7 | | −5.628 | (ASP) | 0.433 | | | | |
| 8 | Lens 4 | −3.055 | (ASP) | 0.430 | Plastic | 1.634 | 23.8 | −10.16 |
| 9 | | −6.130 | (ASP) | 0.595 | | | | |
| 10 | Filter | Plano | | 0.300 | Glass | 1.517 | 64.2 | — |
| 11 | | Plano | | 3.163 | | | | |
| 12 | Image | Plano | | — | | | | |

Note:
Reference wavelength is 587.6 nm (d-line).

TABLE 14

Aspheric Coefficients

| | Surface # | | | |
|---|---|---|---|---|
| | 2 | 3 | 4 | 5 |
| k = | 1.6798E−01 | −8.9745E+01 | 8.9938E+00 | 8.7695E+01 |
| A4 = | −3.4096E−03 | −5.6502E−03 | 1.2380E−02 | −5.0516E−03 |
| A6 = | 1.1663E−03 | −7.6076E−04 | −1.3443E−03 | 2.9221E−03 |
| A8 = | −2.0145E−03 | −4.6823E−04 | 3.1465E−03 | 9.5752E−04 |
| A10 = | 1.1707E−03 | 1.6065E−03 | 1.8021E−03 | −2.4377E−04 |
| A12 = | −4.4302E−04 | 5.7443E−04 | −4.2952E−04 | 3.5021E−04 |
| A14 = | 1.0777E−04 | −1.9070E−04 | 1.9949E−05 | — |
| A16 = | −1.1676E−05 | — | — | — |

| | Surface # | | | |
|---|---|---|---|---|
| | 6 | 7 | 8 | 9 |
| k = | −9.0005E+01 | −5.6432E+00 | −4.6108E−01 | −2.7457E+00 |
| A4 = | −6.5010E−02 | −3.3529E−02 | 3.5288E−02 | 2.8294E−02 |
| A6 = | 5.2741E−04 | 7.7618E−03 | 1.9292E−02 | 7.9456E−03 |
| A8 = | −1.6566E−02 | −6.3280E−04 | −9.1022E−03 | −5.3639E−03 |
| A10 = | 1.5517E−02 | 2.4406E−04 | 1.9283E−03 | 1.5306E−03 |
| A12 = | −7.1080E−03 | −1.5516E−04 | −2.3994E−04 | −2.5427E−04 |
| A14 = | 1.3753E−03 | 2.4113E−05 | 1.7487E−05 | 2.3228E−05 |
| A16 = | — | — | −5.7635E−07 | −8.8194E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 10.09 | |R8/f| | 0.61 |
| Fno | 2.80 | f1/CT2 | 2.68 |
| HFOV [deg.] | 14.9 | |f2/f4| | 0.67 |
| 1/sin(HFOV) | 3.89 | (|P3| + |P4|)/(|P1| + |P2|) | 0.47 |
| V2 | 26.6 | |(2 * Y42)/EPD| | 1.08 |

-continued

| 7th Embodiment | | | |
|---|---|---|---|
| V3 | 20.4 | ImgH/EPD | 0.76 |
| V2 + V3 | 47.0 | ΣAT/BL | 0.30 |
| CT1/CT2 | 0.89 | SAG41/SAG31 | 0.01 |
| CT4/CT2 | 0.25 | f/Yc42 | 15.89 |
| (CT3 + CT4)/CT2 | 0.95 | 2 * arctan(ImgH/2f) | 0.27 |
| TD/CT2 | 3.53 | SDmax/SDmin | 1.39 |
| (R7 + R8)/(R7 − R8) | −2.99 | — | — |

8th Embodiment

Figure 15:
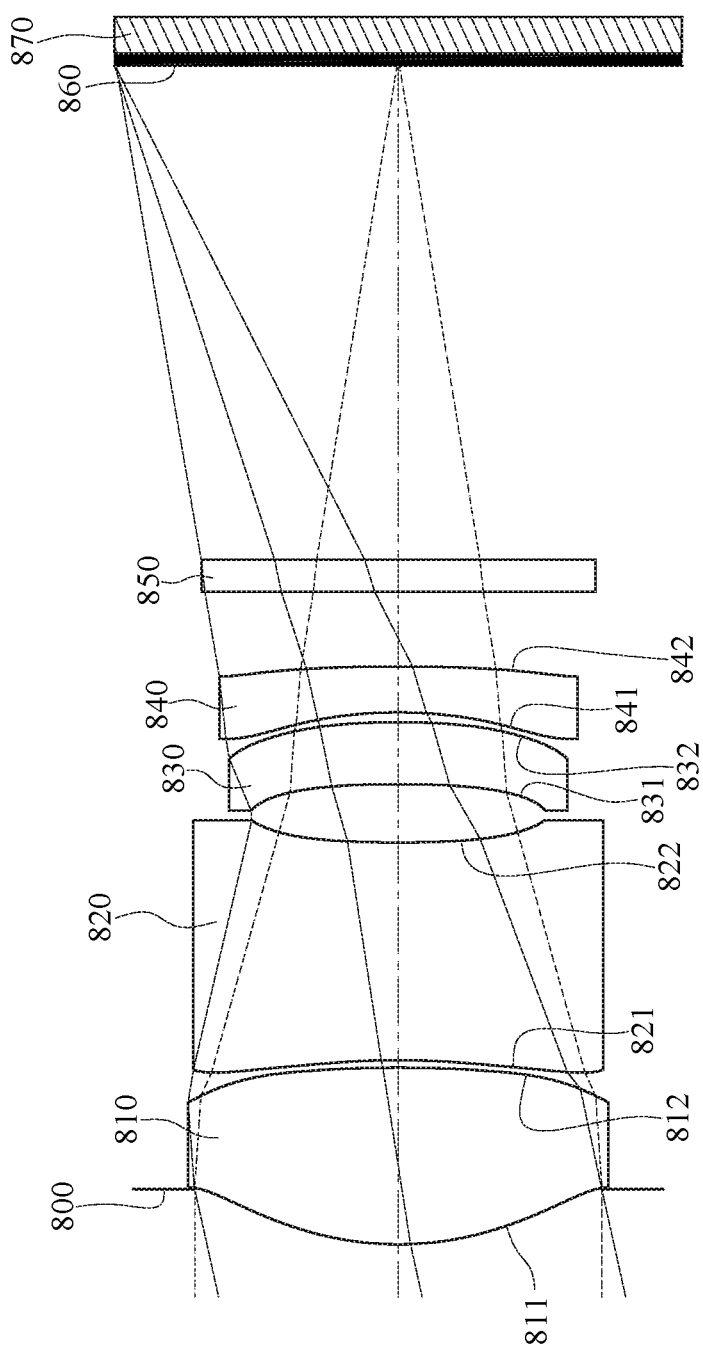
FIG. 15 is a schematic view of an image capturing unit according to the 8th embodiment of the present disclosure.
Figure 16:
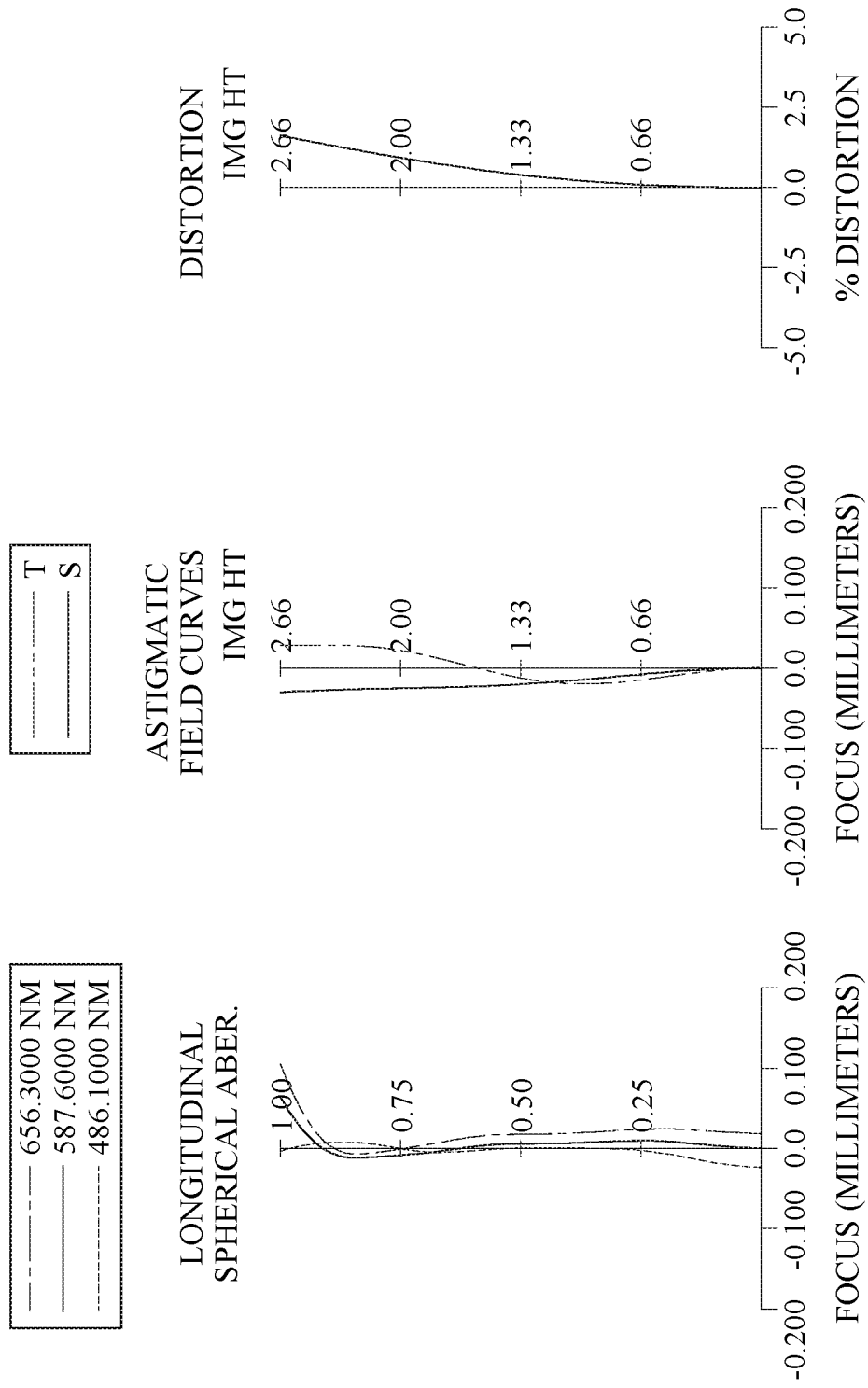
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical imaging lens system (its reference numeral is omitted) of the present disclosure and an image sensor 870. The optical imaging lens system includes, in order from an object side to an image side, an aperture stop 800, a first lens element 810, a second lens element 820, a third lens element 830, a fourth lens element 840, a filter 850 and an image surface 860, wherein the optical imaging lens system has a total of four single and non-cemented lens elements (810-840).

The first lens element 810 with positive refractive power has an object-side surface 811 being convex in a paraxial region thereof and an image-side surface 812 being convex in a paraxial region thereof. The first lens element 810 is made of plastic material and has the object-side surface 811 and the image-side surface 812 being both aspheric.

The second lens element 820 with negative refractive power has an object-side surface 821 being concave in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being concave in a paraxial region thereof and an image-side surface 832 being convex in a paraxial region thereof. The third lens element 830 is made of plastic material and has the object-side surface 831 and the image-side surface 832 being both aspheric.

The fourth lens element 840 with negative refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric. Both the object-side surface 841 and the image-side surface 842 of the fourth lens element 840 have at least one inflection point.

The filter 850 is made of glass material and located between the fourth lens element 840 and the image surface 860, and will not affect the focal length of the optical imaging lens system. The image sensor 870 is disposed on or near the image surface 860 of the optical imaging lens system.

The detailed optical data of the 8th embodiment are shown in Table 15 and the aspheric surface data are shown in Table 16 below.

TABLE 15

8th Embodiment
f = 11.82 mm, Fno = 3.10, HFOV = 12.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.516 | | | | |
| 2 | Lens 1 | 2.966 | (ASP) | 1.657 | Plastic | 1.544 | 55.9 | 4.64 |
| 3 | | −13.527 | (ASP) | 0.070 | | | | |
| 4 | Lens 2 | −7.284 | (ASP) | 2.041 | Plastic | 1.607 | 26.6 | −7.30 |
| 5 | | 12.515 | (ASP) | 0.546 | | | | |
| 6 | Lens 3 | −11.154 | (ASP) | 0.582 | Plastic | 1.650 | 21.5 | 26.54 |
| 7 | | −6.915 | (ASP) | 0.092 | | | | |
| 8 | Lens 4 | −3.947 | (ASP) | 0.430 | Plastic | 1.544 | 55.9 | −9.54 |
| 9 | | −17.119 | (ASP) | 0.701 | | | | |
| 10 | Filter | Plano | | 0.300 | Glass | 1.517 | 64.2 | — |
| 11 | | Plano | | 4.635 | | | | |
| 12 | Image | Plano | | — | | | | |

Note:
Reference wavelength is 587.6 nm (d-line).

TABLE 16

Aspheric Coefficients

| | Surface # | | | |
|---|---|---|---|---|
| | 2 | 3 | 4 | 5 |
| k = | 4.5909E−02 | 1.8465E+01 | 5.3121E+00 | 7.8918E+01 |
| A4 = | −5.2540E−03 | −3.2080E−02 | −1.2353E−02 | 1.3319E−02 |
| A6 = | 2.2548E−03 | 5.9174E−02 | 5.5670E−02 | 1.6590E−02 |
| A8 = | −3.0153E−03 | −4.8433E−02 | −4.5805E−02 | −1.8974E−02 |
| A10 = | 1.4936E−03 | 1.8234E−02 | 1.7713E−02 | 1.2876E−02 |
| A12 = | −4.6760E−04 | −3.3423E−03 | −3.3269E−03 | −3.2128E−03 |
| A14 = | 6.9137E−05 | 2.4235E−04 | 2.5157E−04 | — |
| A16 = | −4.2447E−06 | — | — | — |

| | Surface # | | | |
|---|---|---|---|---|
| | 6 | 7 | 8 | 9 |
| k = | 4.5630E+01 | 4.5453E+00 | 1.4327E+00 | 3.1698E+01 |
| A4 = | −2.4918E−02 | −4.4562E−03 | 3.1751E−02 | 5.3115E−03 |
| A6 = | 6.5710E−03 | −1.8978E−02 | −5.5590E−02 | −1.8032E−02 |
| A8 = | −7.2176E−03 | −5.0662E−03 | 4.0330E−02 | 1.8440E−02 |

TABLE 16-continued

| Aspheric Coefficients | | | |
|---|---|---|---|
| A10 = | −4.0606E−03 | 1.7525E−02 | −1.1778E−02 | −1.0918E−02 |
| A12 = | 8.2959E−03 | −8.3175E−03 | 1.7540E−03 | 3.5372E−03 |
| A14 = | −3.2118E−03 | 1.1444E−03 | −1.3682E−04 | −5.3443E−04 |
| A16 = | — | — | 4.7803E−06 | 2.9669E−05 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 11.82 | |R8/f| | 1.45 |
| Fno | 3.10 | f1/CT2 | 2.27 |
| HFOV [deg.] | 12.5 | |f2/f4| | 0.76 |
| 1/sin(HFOV) | 4.62 | (|P3| + |P4|)/(|P1| + |P2|) | 0.40 |
| V2 | 26.6 | |(2 * Y42)/EPD| | 0.88 |
| V3 | 21.5 | ImgH/EPD | 0.70 |
| V2 + V3 | 48.1 | ΣAT/BL | 0.13 |
| CT1/CT2 | 0.81 | SAG41/SAG31 | 1.01 |
| CT4/CT2 | 0.21 | f/Yc42 | 8.51 |
| (CT3 + CT4)/CT2 | 0.50 | 2 * arctan(ImgH/2f) | 0.22 |
| TD/CT2 | 2.65 | SDmax/SDmin | 1.43 |
| (R7 + R8)/(R7 − R8) | −1.60 | — | — |

9th Embodiment

Figure 17:
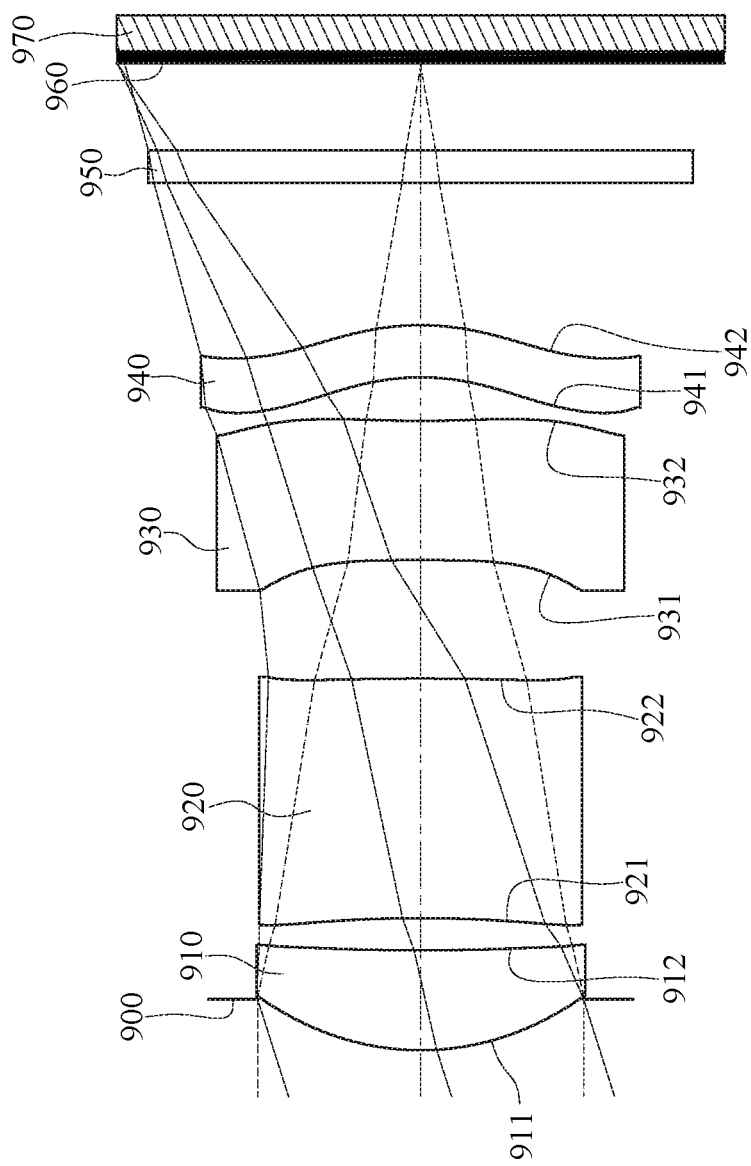
FIG. 17 is a schematic view of an image capturing unit according to the 9th embodiment of the present disclosure.
Figure 18:
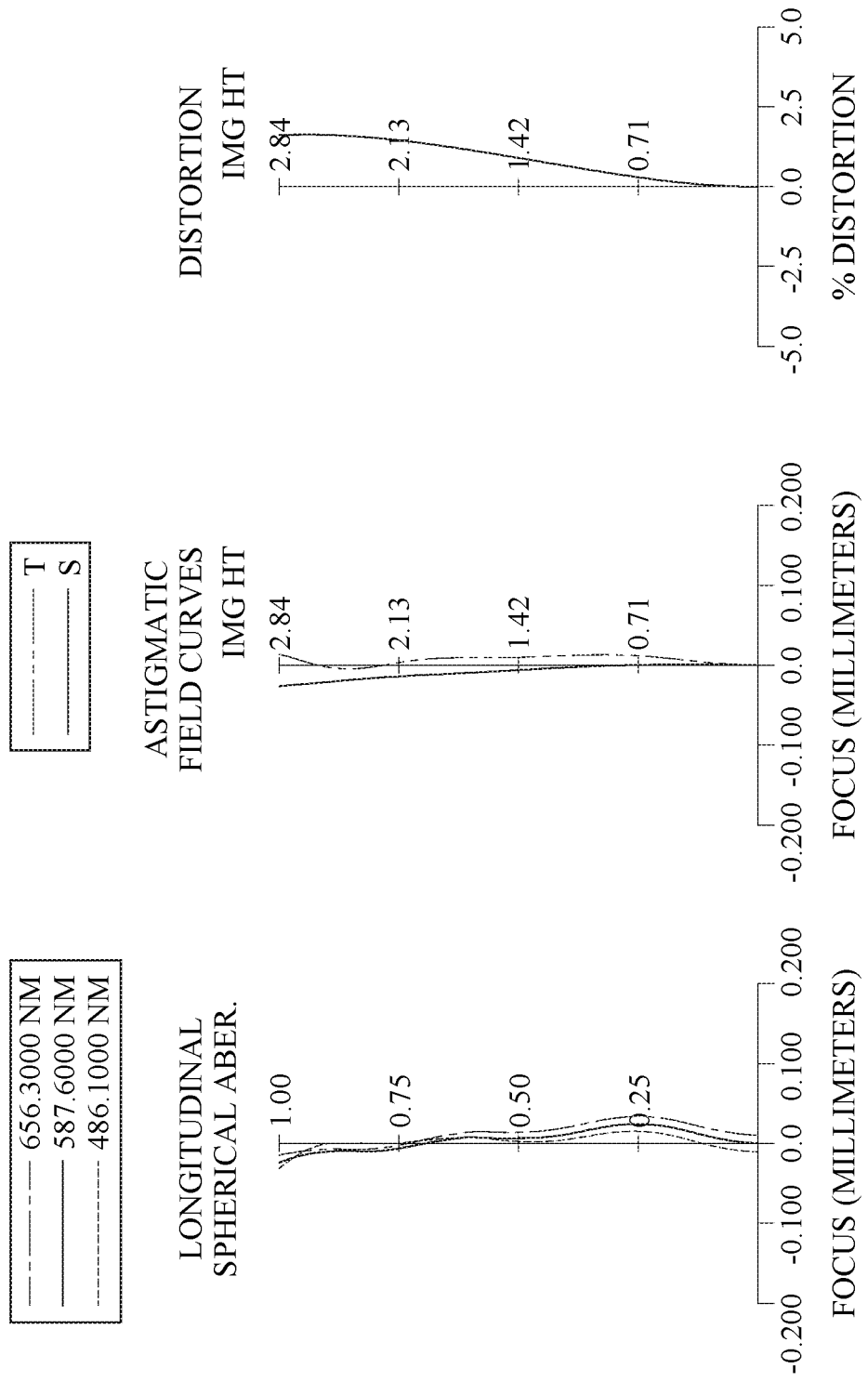
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical imaging lens system (its reference numeral is omitted) of the present disclosure and an image sensor 970. The optical imaging lens system includes, in order from an object side to an image side, an aperture stop 900, a first lens element 910, a second lens element 920, a third lens element 930, a fourth lens element 940, a filter 950 and an image surface 960, wherein the optical imaging lens system has a total of four single and non-cemented lens elements (910-940).

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with negative refractive power has an object-side surface 921 being concave in a paraxial region thereof and an image-side surface 922 being convex in a paraxial region thereof. The second lens element 920 is made of plastic material and has the object-side surface 921 and the image-side surface 922 being both aspheric.

The third lens element 930 with negative refractive power has an object-side surface 931 being concave in a paraxial region thereof and an image-side surface 932 being concave in a paraxial region thereof. The third lens element 930 is made of plastic material and has the object-side surface 931 and the image-side surface 932 being both aspheric.

The fourth lens element 940 with positive refractive power has an object-side surface 941 being concave in a paraxial region thereof and an image-side surface 942 being convex in a paraxial region thereof. The fourth lens element 940 is made of plastic material and has the object-side surface 941 and the image-side surface 942 being both aspheric. Both the object-side surface 941 and the image-side surface 942 of the fourth lens element 940 have at least one inflection point.

The filter 950 is made of glass material and located between the fourth lens element 940 and the image surface 960, and will not affect the focal length of the optical imaging lens system. The image sensor 970 is disposed on or near the image surface 960 of the optical imaging lens system.

The detailed optical data of the 9th embodiment are shown in Table 17 and the aspheric surface data are shown in Table 18 below.

TABLE 17

9th Embodiment
f = 8.79 mm, Fno = 2.88, HFOV = 17.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.475 | | | | |
| 2 | Lens 1 | 2.462 | (ASP) | 0.937 | Plastic | 1.515 | 56.5 | 5.35 |
| 3 | | 20.303 | (ASP) | 0.302 | | | | |
| 4 | Lens 2 | −11.608 | (ASP) | 2.246 | Plastic | 1.660 | 20.4 | −34.41 |
| 5 | | −25.574 | (ASP) | 1.111 | | | | |
| 6 | Lens 3 | −32.258 | (ASP) | 1.304 | Plastic | 1.660 | 20.4 | −10.03 |
| 7 | | 8.460 | (ASP) | 0.409 | | | | |
| 8 | Lens 4 | −2.256 | (ASP) | 0.489 | Plastic | 1.544 | 55.9 | 296.35 |
| 9 | | −2.395 | (ASP) | 1.337 | | | | |
| 10 | Filter | Plano | | 0.300 | Glass | 1.517 | 64.2 | — |

TABLE 17-continued

9th Embodiment
f = 8.79 mm, Fno = 2.88, HFOV = 17.6 deg.

| Surface # | | Curvature Radius | Thickness | Material | Index | Abbe # | Focal Length |
|---|---|---|---|---|---|---|---|
| 11 | | Plano | 0.820 | | | | |
| 12 | Image | Plano | — | | | | |

Note:
Reference wavelength is 587.6 nm (d-line).

TABLE 18

Aspheric Coefficients

| | Surface # | | | |
|---|---|---|---|---|
| | 2 | 3 | 4 | 5 |
| k = | 8.1992E−02 | 9.0000E+01 | 2.5578E+01 | −8.7543E+01 |
| A4 = | −4.6898E−03 | −2.2914E−03 | 2.8569E−03 | 3.8912E−05 |
| A6 = | 8.8565E−03 | −3.4173E−03 | 3.2104E−05 | 3.4027E−05 |
| A8 = | −1.7589E−02 | 2.6826E−03 | 1.1436E−03 | 1.2358E−03 |
| A10 = | 1.6552E−02 | −1.4665E−03 | −2.9878E−04 | −8.6424E−04 |
| A12 = | −8.6189E−03 | 4.0627E−04 | 1.3339E−04 | 4.4316E−04 |
| A14 = | 2.2910E−03 | 4.1706E−06 | 1.0371E−05 | — |
| A16 = | −2.4311E−04 | — | — | — |

| | Surface # | | | |
|---|---|---|---|---|
| | 6 | 7 | 8 | 9 |
| k = | −2.5339E+01 | 1.5301E+01 | −1.0934E+00 | −1.3279E+00 |
| A4 = | −5.4143E−02 | −6.0369E−02 | −7.3738E−03 | 7.9063E−03 |
| A6 = | 5.8134E−03 | 1.7812E−02 | 4.1809E−02 | 1.8529E−02 |
| A8 = | −6.4431E−03 | −6.0686E−03 | −1.0889E−02 | −2.2054E−03 |
| A10 = | 2.8719E−03 | 1.1862E−03 | −1.6114E−03 | −1.3204E−03 |
| A12 = | −6.8638E−04 | −1.0221E−04 | 1.2653E−03 | 4.0520E−04 |
| A14 = | 1.5741E−04 | 5.1608E−06 | −2.1452E−04 | −3.8548E−05 |
| A16 = | — | — | 1.2082E−05 | 1.0908E−06 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 8.79 | |R8/f| | 0.27 |
| Fno | 2.88 | f1/CT2 | 2.38 |
| HFOV [deg.] | 17.6 | |f2/f4| | 0.12 |
| 1/sin(HFOV) | 3.31 | (|P3| + |P4|)/(|P1| + |P2|) | 0.48 |
| V2 | 20.4 | |(2 * Y42)/EPD| | 1.35 |
| V3 | 20.4 | ImgH/EPD | 0.93 |
| V2 + V3 | 40.8 | ΣAT/BL | 0.74 |
| CT1/CT2 | 0.42 | SAG41/SAG31 | 0.99 |
| CT4/CT2 | 0.22 | f/Yc42 | 9.31 |
| (CT3 + CT4)/CT2 | 0.80 | 2 * arctan(ImgH/2f) | 0.32 |
| TD/CT2 | 3.03 | SDmax/SDmin | 1.44 |
| (R7 + R8)/(R7 − R8) | −33.54 | — | — |

10th Embodiment

Figure 19:
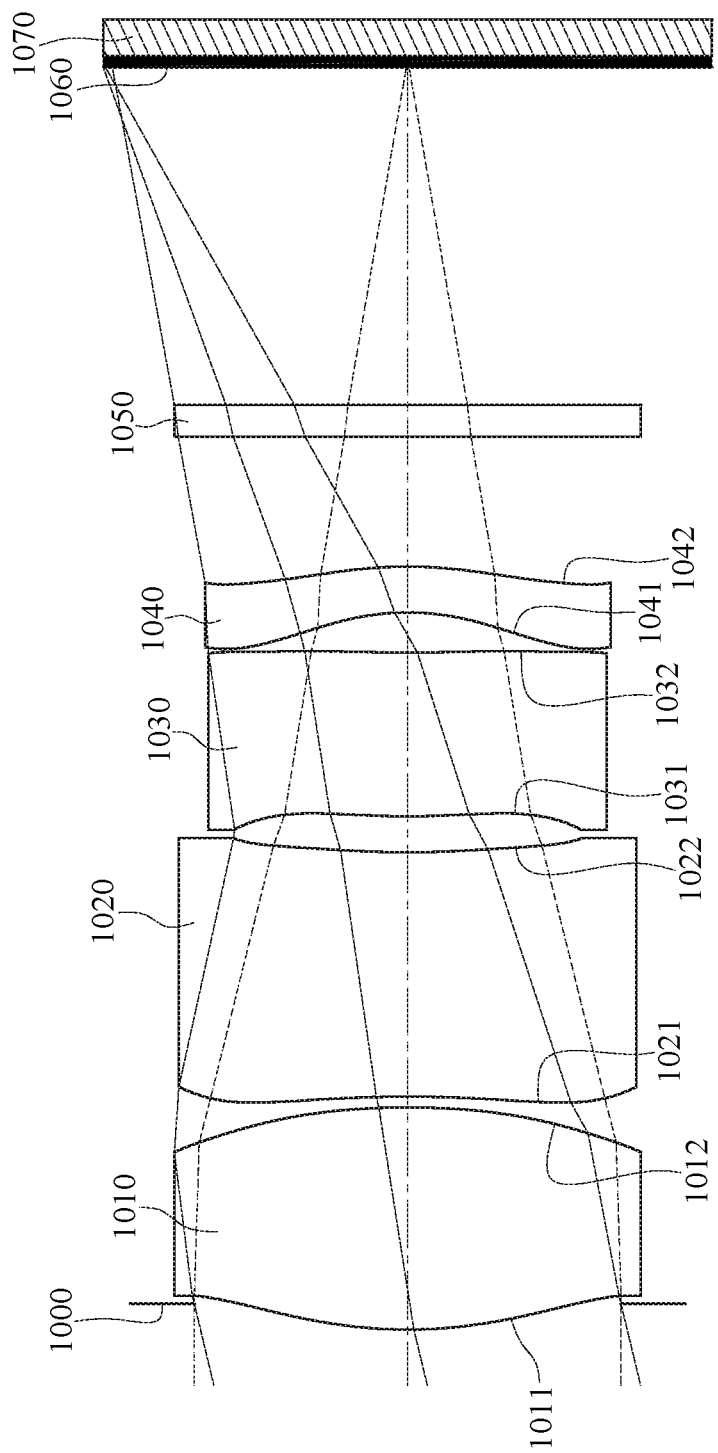
FIG. 19 is a schematic view of an image capturing unit according to the 10th embodiment of the present disclosure.
Figure 20:
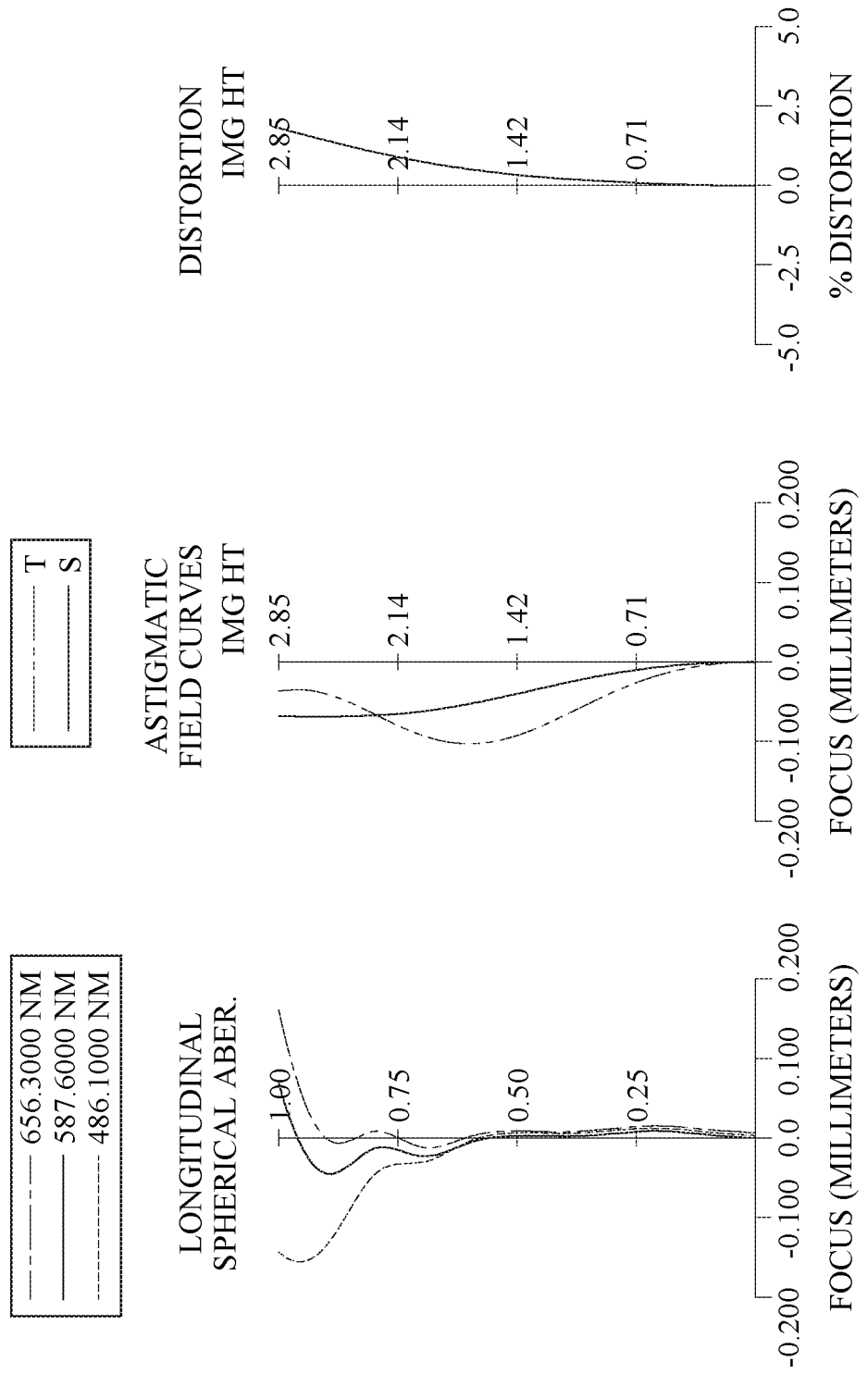
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the optical imaging lens system (its reference numeral is omitted) of the present disclosure and an image sensor 1070. The optical imaging lens system includes, in order from an object side to an image side, an aperture stop 1000, a first lens element 1010, a second lens element 1020, a third lens element 1030, a fourth lens element 1040, a filter 1050 and an image surface 1060, wherein the optical imaging lens system has a total of four single and non-cemented lens elements (1010-1040).

The first lens element 1010 with positive refractive power has an object-side surface 1011 being convex in a paraxial region thereof and an image-side surface 1012 being convex in a paraxial region thereof. The first lens element 1010 is made of plastic material and has the object-side surface 1011 and the image-side surface 1012 being both aspheric.

The second lens element 1020 with negative refractive power has an object-side surface 1021 being concave in a paraxial region thereof and an image-side surface 1022 being concave in a paraxial region thereof. The second lens element 1020 is made of plastic material and has the object-side surface 1021 and the image-side surface 1022 being both aspheric.

The third lens element 1030 with positive refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric.

The fourth lens element 1040 with negative refractive power has an object-side surface 1041 being concave in a paraxial region thereof and an image-side surface 1042 being convex in a paraxial region thereof. The fourth lens element 1040 is made of plastic material and has the object-side surface 1041 and the image-side surface 1042 being both aspheric. Both the object-side surface 1041 and the image-side surface 1042 of the fourth lens element 1040 have at least one inflection point.

The filter 1050 is made of glass material and located between the fourth lens element 1040 and the image surface 1060, and will not affect the focal length of the optical imaging lens system. The image sensor 1070 is disposed on or near the image surface 1060 of the optical imaging lens system.

The detailed optical data of the 10th embodiment are shown in Table 19 and the aspheric surface data are shown in Table 20 below.

TABLE 19

10th Embodiment
f = 11.67 mm, Fno = 2.92, HFOV = 13.5 deg.

| Surface # |           | Curvature Radius |       | Thickness | Material | Index | Abbe # | Focal Length |
|-----------|-----------|------------------|-------|-----------|----------|-------|--------|--------------|
| 0         | Object    | Plano            |       | Infinity  |          |       |        |              |
| 1         | Ape. Stop | Plano            |       | −0.240    |          |       |        |              |
| 2         | Lens 1    | 4.417            | (ASP) | 2.083     | Plastic  | 1.544 | 55.9   | 5.35         |
| 3         |           | −7.124           | (ASP) | 0.101     |          |       |        |              |
| 4         | Lens 2    | −11.236          | (ASP) | 2.291     | Plastic  | 1.639 | 23.5   | −7.20        |
| 5         |           | 8.398            | (ASP) | 0.337     |          |       |        |              |
| 6         | Lens 3    | 7.062            | (ASP) | 1.536     | Plastic  | 1.639 | 23.3   | 20.00        |
| 7         |           | 14.459           | (ASP) | 0.375     |          |       |        |              |
| 8         | Lens 4    | −2.377           | (ASP) | 0.430     | Plastic  | 1.544 | 55.9   | −11.07       |
| 9         |           | −4.178           | (ASP) | 1.218     |          |       |        |              |
| 10        | Filter    | Plano            |       | 0.300     | Glass    | 1.517 | 64.2   | —            |
| 11        |           | Plano            |       | 3.160     |          |       |        |              |
| 12        | Image     | Plano            |       | —         |          |       |        |              |

Note:
Reference wavelength is 587.6 nm (d-line).

TABLE 20

Aspheric Coefficients

| Surface # | 2 | 3 | 4 | 5 |
|---|---|---|---|---|
| k =  | −4.4382E−01 | 4.5430E+00 | 1.3524E+01 | −7.2490E+01 |
| A4 = | −5.0428E−03 | −3.7025E−03 | 7.8445E−03 | −6.3297E−03 |
| A6 = | 6.8887E−04 | −1.6214E−03 | −9.7043E−04 | 2.2843E−04 |
| A8 = | −1.9180E−03 | 1.2022E−03 | 1.1473E−03 | 5.6314E−04 |
| A10 = | 1.2796E−03 | −2.9248E−04 | −9.1823E−05 | 7.6268E−05 |
| A12 = | −4.9902E−04 | 4.9006E−05 | −7.9944E−06 | 7.1215E−05 |
| A14 = | 9.7185E−05 | −4.3008E−06 | 3.2462E−07 | — |
| A16 = | −7.3094E−06 | — | — | — |

| Surface # | 6 | 7 | 8 | 9 |
|---|---|---|---|---|
| k =  | −1.6787E+01 | 4.1836E+01 | −1.6263E−01 | 2.0153E−01 |
| A4 = | −4.1289E−02 | −4.1111E−02 | −1.1584E−02 | 7.5542E−03 |
| A6 = | 3.2944E−03 | 1.9819E−02 | 5.9866E−02 | 2.5464E−02 |
| A8 = | −4.6385E−03 | −5.8949E−03 | −2.8981E−02 | −1.2484E−02 |
| A10 = | 2.7307E−03 | 1.1371E−03 | 6.6006E−03 | 1.9587E−03 |
| A12 = | −6.5630E−04 | −1.2023E−04 | −3.4710E−04 | 1.1513E−04 |
| A14 = | 4.4849E−05 | −5.7579E−07 | −9.1332E−05 | −5.0596E−05 |
| A16 = | — | — | 9.9742E−06 | 2.9767E−06 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 11.67 | |R8/f| | 0.36 |
| Fno | 2.92 | f1/CT2 | 2.34 |
| HFOV [deg.] | 13.5 | |f2/f4| | 0.65 |
| 1/sin(HFOV) | 4.28 | (|P3| + |P4|)/(|P1| + |P2|) | 0.43 |
| V2 | 23.5 | |(2 * Y42)/EPD| | 0.95 |
| V3 | 23.3 | ImgH/EPD | 0.71 |
| V2 + V3 | 46.8 | ΣAT/BL | 0.17 |
| CT1/CT2 | 0.91 | SAG41/SAG31 | 2.64 |
| CT4/CT2 | 0.19 | f/Yc42 | 13.49 |
| (CT3 + CT4)/CT2 | 0.86 | 2 * arctan(ImgH/2f) | 0.24 |
| TD/CT2 | 3.12 | SDmax/SDmin | 1.35 |
| (R7 + R8)/(R7 − R8) | −3.64 | — | — |

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens system comprising, in order from an object side to an image side:
   a first lens element having positive refractive power;
   a second lens element having negative refractive power;
   a third lens element; and
   a fourth lens element having an object-side surface being concave in a paraxial region thereof, wherein at least one of the object-side surface and an image-side surface of the fourth lens element has at least one inflection point;
   wherein the optical imaging lens system has a total of four lens elements, a central thickness of the first lens element is CT1, a central thickness of the second lens element is CT2, a central thickness of the fourth lens element is CT4, a focal length of the optical imaging lens system is f, a ratio of the focal length of the optical imaging lens system to a focal length of the first lens element is P1, a ratio of the focal length of the optical imaging lens system to a focal length of the second lens element is P2, a ratio of the focal length of the optical imaging lens system to a focal length of the third lens element is P3, a ratio of the focal length of the optical imaging lens system to a focal length of the fourth lens element is P4, a curvature radius of the image-side surface of the fourth lens element is R8, and the following conditions are satisfied:

$0 < CT1/CT2 < 1.20;$ $0 < CT4/CT2 < 0.45;$ $(|P3|+|P4|)/(|P1|+|P2|) < 0.63;$ and $|R8/f| < 7.0.$ 2. The optical imaging lens system of claim 1, wherein the third lens element has an object-side surface being convex in a paraxial region thereof and an image-side surface being concave in a paraxial region thereof.

3. The optical imaging lens system of claim 1, wherein the central thickness of the first lens element is CT1, the central thickness of the second lens element is CT2, and the following condition is satisfied:

$0 < CT1/CT2 < 1.0.$

4. The optical imaging lens system of claim 1, wherein a vertical distance between a maximum effective radius position of the image-side surface of the fourth lens element and an optical axis is Y42, an entrance pupil diameter of the optical imaging lens system is EPD, and the following condition is satisfied:

$|(2*Y42)/EPD| \leq 1.35.$

5. The optical imaging lens system of claim 1, wherein a vertical distance between a maximum effective radius position of the image-side surface of the fourth lens element and an optical axis is Y42, an entrance pupil diameter of the optical imaging lens system is EPD, and the following condition is satisfied:

$|(2*Y42)/EPD| < 1.0.$

6. The optical imaging lens system of claim 1, wherein the ratio of the focal length of the optical imaging lens system to the focal length of the first lens element is P1, the ratio of the focal length of the optical imaging lens system to the focal length of the second lens element is P2, the ratio of the focal length of the optical imaging lens system to the focal length of the third lens element is P3, the ratio of the focal length of the optical imaging lens system to the focal length of the fourth lens element is P4, and the following condition is satisfied:

$(|P3|+|P4|)/(|P1|+|P2|) < 0.55.$

7. The optical imaging lens system of claim 1, wherein a sum of axial distances between each adjacent lens element of the optical imaging lens system is ΣAT, an axial distance between the image-side surface of the fourth lens element and an image surface is BL, the focal length of the optical imaging lens system is f, a vertical distance between the at least one inflection point on the image-side surface of the fourth lens element and an optical axis is Yc42, and the following conditions are satisfied:

$\Sigma AT/BL < 1.10;$ and $3.0 < f/Yc42 < 25.0.$

8. The optical imaging lens system of claim 1, wherein a curvature radius of the object-side surface of the fourth lens element is R7, the curvature radius of the image-side surface of the fourth lens element is R8, and the following condition is satisfied:

$(R7+R8)/(R7-R8) < -1.30.$

9. The optical imaging lens system of claim 1, wherein half of a maximum field of view of the optical imaging lens system is HFOV, an Abbe number of the second lens element is V2, an Abbe number of the third lens element is V3, and the following conditions are satisfied:

$$3.45<1/\sin(\text{HFOV});$$

$$V2\leq30;\text{ and}$$

$$V3\leq30.$$

10. The optical imaging lens system of claim 1, further comprising an aperture stop disposed between an imaged object and the first lens element, wherein a maximum image height of the optical imaging lens system is ImgH, an entrance pupil diameter of the optical imaging lens system is EPD, and the following condition is satisfied:

$$0<\text{ImgH}/\text{EPD}\leq1.$$

11. The optical imaging lens system of claim 1, further comprising at least one prism.

12. An optical imaging lens system comprising, in order from an object side to an image side:
   a first lens element having positive refractive power;
   a second lens element having negative refractive power;
   a third lens element; and
   a fourth lens element having an object-side surface being concave in a paraxial region thereof, wherein at least one of the object-side surface and an image-side surface of the fourth lens element has at least one inflection point;
   wherein the optical imaging lens system has a total of four lens elements, a central thickness of the first lens element is CT1, a central thickness of the second lens element is CT2, a focal length of the first lens element is f1, a focal length of the second lens element is f2, a focal length of the fourth lens element is f4, and the following conditions are satisfied:

$$0<CT1/CT2<1.20;$$

$$0<f1/CT2<3.60;\text{ and}$$

$$|f2/f4|<1.05.$$

13. The optical imaging lens system of claim 12, wherein the third lens element has an image-side surface being concave in a paraxial region thereof.

14. The optical imaging lens system of claim 12, wherein a focal length of the optical imaging lens system is f, a curvature radius of the image-side surface of the fourth lens element is R8, and the following condition is satisfied:

$$0.25<|R8/f|<5.0.$$

15. The optical imaging lens system of claim 12, wherein a vertical distance between a maximum effective radius position of the image-side surface of the fourth lens element and an optical axis is Y42, an entrance pupil diameter of the optical imaging lens system is EPD, and the following condition is satisfied:

$$|(2*Y42)/\text{EPD}|<1.0.$$

16. The optical imaging lens system of claim 12, wherein the focal length of the second lens element is f2, the focal length of the fourth lens element is f4, and the following condition is satisfied:

$$|f2/f4|<0.90.$$

17. The optical imaging lens system of claim 12, wherein a displacement in parallel with an optical axis from an axial vertex of an object-side surface of the third lens element to a maximum effective radius position of the object-side surface of the third lens element is SAG31, a displacement in parallel with the optical axis from an axial vertex of the object-side surface of the fourth lens element to a maximum effective radius position of the object-side surface of the fourth lens element is SAG41, and the following condition is satisfied:

$$-0.10<SAG41/SAG31<6.50.$$

18. The optical imaging lens system of claim 12, wherein a ratio of a focal length of the optical imaging lens system to the focal length of the first lens element is P1, a ratio of the focal length of the optical imaging lens system to the focal length of the second lens element is P2, a ratio of the focal length of the optical imaging lens system to a focal length of the third lens element is P3, a ratio of the focal length of the optical imaging lens system to the focal length of the fourth lens element is P4, an Abbe number of the second lens element is V2, an Abbe number of the third lens element is V3, and the following conditions are satisfied:

$$(|P3|+|P4|)/(|P1|+|P2|)<0.63;\text{ and}$$

$$V2+V3<50.0.$$

19. The optical imaging lens system of claim 12, wherein an axial distance between an object-side surface of the first lens element and the image-side surface of the fourth lens element is TD, the central thickness of the second lens element is CT2, and the following condition is satisfied:

$$0<TD/CT2<3.55.$$

20. The optical imaging lens system of claim 12, wherein the central thickness of the second lens element is CT2, a central thickness of the third lens element is CT3, a central thickness of the fourth lens element is CT4, and the following condition is satisfied:

$$0<(CT3+CT4)/CT2<1.0.$$

21. The optical imaging lens system of claim 12, wherein a maximum image height of the optical imaging lens system is ImgH, a focal length of the optical imaging lens system is f, and the following condition is satisfied:

$$0(\text{rad})<2*\arctan(\text{ImgH}/2f)<0.35(\text{rad}).$$

22. The optical imaging lens system of claim 12, further comprising an aperture stop disposed between an imaged object and the first lens element, wherein a maximum value among all maximum effective radii of all surfaces of the lens elements of the optical imaging lens system is SDmax, a minimum value among all maximum effective radii of all surfaces of the lens elements of the optical imaging lens system is SDmin, and the following condition is satisfied:

$$SD\text{max}/SD\text{min}<2.0.$$

23. The optical imaging lens system of claim 12, further comprising at least one prism, wherein an axial distance between the second lens element and the third lens element is maximum among all axial distances between each adjacent lens element of the optical imaging lens system.

24. The optical imaging lens system of claim 23, wherein an axial distance between the first lens element and the second lens element is T12, the axial distance between the second lens element and the third lens element is T23, an axial distance between the third lens element and the fourth lens element is T34, and the following condition is satisfied:

$$T12<T34<T23.$$

25. An image capturing unit, comprising:
the optical imaging lens system of claim 12; and
an image sensor, wherein the image sensor is disposed on an image surface of the optical imaging lens system.

26. An electronic device, comprising:
the image capturing unit of claim 25.

27. An optical imaging lens system comprising, in order from an object side to an image side:
a first lens element having positive refractive power;
a second lens element having negative refractive power;
a third lens element; and
a fourth lens element having an image-side surface being convex in a paraxial region thereof, wherein at least one of an object-side surface and the image-side surface of the fourth lens element has at least one inflection point;
wherein the optical imaging lens system has a total of four lens elements, a central thickness of the first lens element is CT1, a central thickness of the second lens element is CT2, a focal length of the optical imaging lens system is f, a focal length of the first lens element is f1, a curvature radius of the image-side surface of the fourth lens element is R8, and the following conditions are satisfied:

$0<CT1/CT2<1.20;$ $0<f1/CT2<3.60;$ and $|R8/f|<7.0.$

28. The optical imaging lens system of claim 27, wherein each of the lens elements of the optical imaging lens system is a single and non-cemented lens element; the central thickness of the second lens element is CT2, the focal length of the first lens element is f1, and the following condition is satisfied:

$0<f1/CT2<3.20.$

29. The optical imaging lens system of claim 27, wherein a ratio of the focal length of the optical imaging lens system to the focal length of the first lens element is P1, a ratio of the focal length of the optical imaging lens system to a focal length of the second lens element is P2, a ratio of the focal length of the optical imaging lens system to a focal length of the third lens element is P3, a ratio of the focal length of the optical imaging lens system to a focal length of the fourth lens element is P4, and the following condition is satisfied:

$(|P3|+|P4|)/(|P1|+|P2|)<0.63.$

30. The optical imaging lens system of claim 27, wherein half of a maximum field of view of the optical imaging lens system is HFOV, an Abbe number of the second lens element is V2, an Abbe number of the third lens element is V3, and the following conditions are satisfied:

$3.45<1/\sin(HFOV);$ $V2 \leq 30;$ and $V3 \leq 30.$

31. The optical imaging lens system of claim 27, further comprising at least one prism, wherein a vertical distance between a maximum effective radius position of the image-side surface of the fourth lens element and an optical axis is Y42, an entrance pupil diameter of the optical imaging lens system is EPD, and the following condition is satisfied:

$|(2*Y42)/EPD|<1.0.$

32. The optical imaging lens system of claim 27, wherein the focal length of the optical imaging lens system is f, a vertical distance between the at least one inflection point on the image-side surface of the fourth lens element and an optical axis is Yc42, and the following condition is satisfied:

$3.0<f/Yc42<25.0.$

* * * * *